US 11,772,745 B2

(12) United States Patent
Ljøsne et al.

(10) Patent No.: US 11,772,745 B2
(45) Date of Patent: Oct. 3, 2023

(54) PEDALLY PROPELLED VEHICLE MULTI-SPEED GEAR SYSTEM

(71) Applicant: CA TECHNOLOGY SYSTEMS AS, Oslo (NO)

(72) Inventors: Knut Tore Ljøsne, Oslo (NO); Christian Antal, Oslo (NO)

(73) Assignee: CA TECHNOLOGY SYSTEMS AS, Oslo (NO)

( * ) Notice: Subject to any disclaimer, the term of this patent is extended or adjusted under 35 U.S.C. 154(b) by 0 days.

(21) Appl. No.: 17/415,868

(22) PCT Filed: Dec. 15, 2019

(86) PCT No.: PCT/NO2019/050276
§ 371 (c)(1),
(2) Date: Jun. 18, 2021

(87) PCT Pub. No.: WO2020/130842
PCT Pub. Date: Jun. 25, 2020

(65) Prior Publication Data
US 2022/0055716 A1     Feb. 24, 2022

(30) Foreign Application Priority Data

Dec. 21, 2018   (NO) .................................. 20181673

(51) Int. Cl.
*F16H 3/66*     (2006.01)
*F16D 41/24*    (2006.01)
(Continued)

(52) U.S. Cl.
CPC ........... *B62M 11/18* (2013.01); *B62M 11/145* (2013.01); *F16D 21/00* (2013.01);
(Continued)

(58) Field of Classification Search
CPC ..... B62M 11/18; B62M 11/145; B62M 11/14; F16D 21/00; F16D 21/02; F16D 41/24;
(Continued)

(56) References Cited

U.S. PATENT DOCUMENTS

| 4,065,984 A | 1/1978 | Nakajima |
| 5,527,230 A | 6/1996 | Meier-Burkamp |
| 7,887,455 B2 * | 2/2011 | Hino ...................... B62M 11/16 475/275 |
| 9,279,480 B2 | 3/2016 | Antal et al. |

(Continued)

FOREIGN PATENT DOCUMENTS

| CN | 106335595 A | 1/2017 |
| DE | 19720796 A1 | 11/1998 |

(Continued)

OTHER PUBLICATIONS

International Search Report, issued in PCT/NO2019/050276, PCT/ISA/210, dated Apr. 2, 2020.
Written Opinion of the International Searching Authority, issued in PCT/N02019/050276, PCT/ISA/210. dated Apr. 2, 2020.

*Primary Examiner* — Stacey A Fluhart
*Assistant Examiner* — Farhana Pervin
(74) *Attorney, Agent, or Firm* — Birch, Stewart, Kolasch & Birch, LLP

(57) ABSTRACT

A pedally propelled vehicle multi speed gear system includes a gear mechanism including a main shaft; a hollow first shaft and a hollow second shaft, both axially stationary and rotatably arranged about the main shaft; an epicyclical first gear section arranged about the main shaft between the first and second shafts, and including two radially stacked carrier elements; and a first shift mechanism arranged between the first shaft and the first gear section, and configured to rotationally engage the first shaft with either of the two radially stacked carriers. The first shift mechanism (Continued)

includes two first clutches radially stacked about the main shaft.

15 Claims, 13 Drawing Sheets

(51) Int. Cl.
    *B62M 11/18*     (2006.01)
    *B62M 11/14*     (2006.01)
    *F16D 21/00*     (2006.01)
    *F16D 21/02*     (2006.01)

(52) U.S. Cl.
    CPC ............... *F16D 41/24* (2013.01); *F16H 3/66* (2013.01); *F16D 21/02* (2013.01); *F16H 2200/201* (2013.01); *F16H 2200/2007* (2013.01); *F16H 2200/2046* (2013.01); *F16H 2200/2051* (2013.01); *F16H 2200/2079* (2013.01)

(58) Field of Classification Search
    CPC .... F16D 41/06; F16H 3/66; F16H 2200/2007; F16H 2200/201; F16H 2200/2046; F16H 2200/2051; F16H 2200/2079; F16H 2200/2097; F16H 2003/007
    See application file for complete search history.

(56) References Cited

U.S. PATENT DOCUMENTS

| | | | |
|---|---|---|---|
| 10,351,209 B2 * | 7/2019 | Yamamoto | B62M 11/16 |
| 2009/0036262 A1 * | 2/2009 | Hino | B62M 11/18 |
| | | | 475/318 |
| 2011/0009231 A1 * | 1/2011 | Shoge | B60B 27/047 |
| | | | 475/297 |
| 2011/0241306 A1 * | 10/2011 | Serkh | F16H 3/663 |
| | | | 475/277 |
| 2013/0337964 A1 * | 12/2013 | Souda | F16H 3/663 |
| | | | 475/280 |
| 2013/0345013 A1 * | 12/2013 | Antal | B62M 11/16 |
| | | | 475/269 |
| 2017/0291449 A1 * | 10/2017 | Yamamoto | B60B 27/047 |

FOREIGN PATENT DOCUMENTS

| | | | | |
|---|---|---|---|---|
| DE | 102016225144 A | | 6/2018 | |
| EP | 2169272 A1 * | | 3/2010 | ........... F16H 57/023 |
| WO | WO 2012/128639 A1 | | 9/2012 | |

* cited by examiner

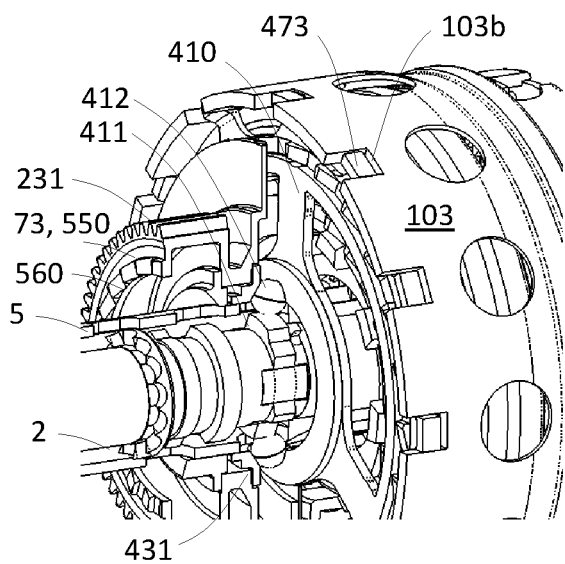
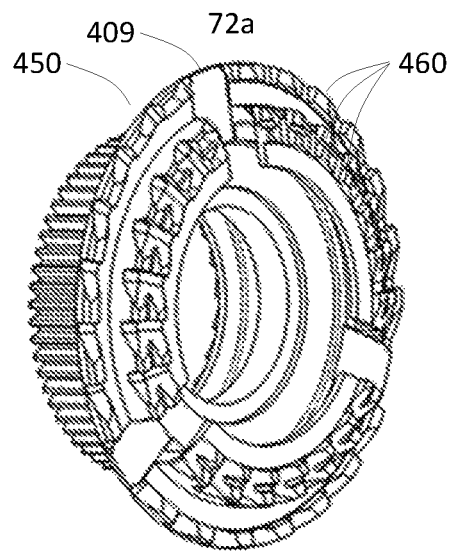
Fig. 7a    Fig. 7b
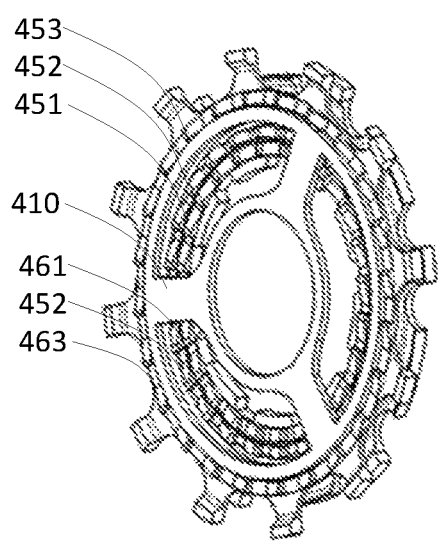
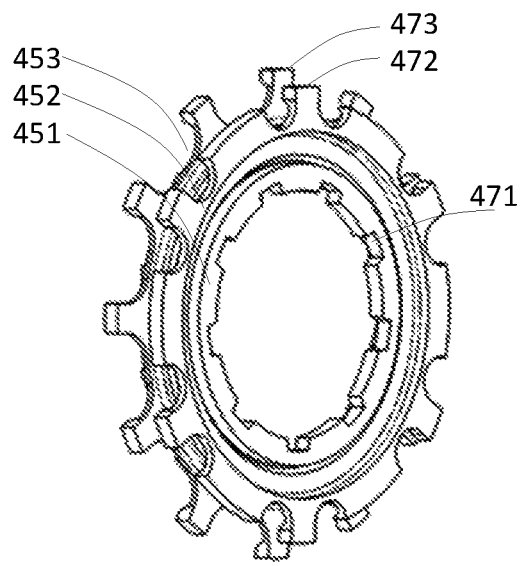
Fig. 7c    Fig. 7d

PEDALLY PROPELLED VEHICLE MULTI-SPEED GEAR SYSTEM

TECHNICAL FIELD

The present invention relates to epicyclical internal gear mechanisms for pedally propelled vehicles.

BACKGROUND

Internal gear mechanisms for pedally vehicles are experiencing resurgence in popularity due to their robustness, long service life, and recent technological improvements. When external gears, which are exposed and prone to impacts, deteriorate quickly, and require frequent maintenance, are shifted, the chain bends sideways and its bushings wear and stretch which causes cogs and chain rings to wear prematurely.

Internal gears are in this sense more optimal, but typical multispeed ones cannot handle the high torque of rider and assist motor. Most internal gears are shifted solely by means of pawls, or as in the case of e.g. DE19720796, with both pawls and axial clutches, although U.S. Pat. No. 9,279,480 offers improvement on many levels. Further optimization are desirable, to simplify, reduce cost, and improve function.

A further challenge is how to simplify assembly, e.g. make a gear stack tolerance precise and how to close the gear hub, so as to provide an optimum gear stack width given the mechanism of an internal gear stack. Traditionally, the hub is provided with large diameter locking ball bearings, which is a heavy and costly means, and the hub end cover is either screwed onto the hub shell, or held in place with bolts, where neither of these solutions are optimal. Often the axle is threaded and a nut with a ball bearing race is tightened manually to what is assumed a proper fit.

Yet another challenge relates to the wider tires casings of modern fat bikes. This require wider axle mounts and distance between the hub bearings, increasing mechanical stress and the risk of failure of bearings, main shaft, and other parts. Axles of internal gears are typically provided as an axial rod with shift mechanisms surrounding it, without an internal tunnel, resulting in a heavy axle that also disallows use of a through-bolt. Axles with an internal shift axle tunnel, have machined axial penetrations extending a considerable distance along the axle to allow pawls to shift the mechanisms, reducing torsional structural integrity. To maintain rigidity and strength, material is added, increasing weight and cost.

Some of the challenges above have been addressed in WO2012128639A1, but structural and functional issues remain to be solved.

Short Summary

A goal with the present invention is to overcome the problems of prior art.

The invention solving the above mentioned problems is in an aspect, a pedally propelled vehicle multi speed gear system according to the independent claims.

The functionality of the multi speed gear system is improved over prior art multi speed gear systems. Further, the number of components have been reduced, and assembly and maintenance have been simplified. This in turn allows the total cost of the gear to be reduced.

BRIEF DESCRIPTION OF THE DRAWINGS

In FIG. 4a, the first inner clutch element (351) is engaged with the first common clutch element (350), while the first middle and outer clutch elements (352, 353) are free-wheeling. Torque is here transferred from the first shaft (71) to the first inner carrier (101).

In FIG. 4b, the first middle clutch element (352) is engaged with the first common clutch element (350), while the first outer clutch element (353) is free-wheeling and the first inner clutch element (351) is disengaged. Torque is here transferred from the first shaft (71) to the first middle carrier (102).

In FIG. 4c, the first outer clutch element (353) is engaged with the first common clutch element (350), while the first inner and middle clutch elements (351, 352) are disengaged. Torque is here transferred from the first shaft (71) to the first outer carrier (103).

In FIG. 5a, the second outer clutch element (453) is engaged with the second common clutch element (450), while the second inner and middle clutch elements (451, 452) are free-wheeling. Torque is here transferred from the first outer carrier (103) to the second shaft (72a).

In FIG. 5b, the second middle clutch element (452) is engaged with the second common clutch element (450), while the second inner clutch element (451) is free-wheeling and the second outer clutch element (453) is disengaged. Torque is here transferred from the first middle carrier (102) to the second shaft (72a).

In FIG. 5c, the second inner clutch element (451) is engaged with the second common clutch element (450), while the second middle and outer clutch elements (452, 453) are disengaged. Torque is here transferred from the first inner carrier (101) to the second shaft (72a).

FIGS. 7a, 7b, 7c, 7d, 7e, 7f, 7g, and 7h illustrate in perspective and partly cut away views, some elements related to the second shift mechanism (40) of an embodiment of the invention.

In FIG. 5d, the third inner clutch element (551) is engaged with the third common clutch element (550), while the fourth first and second clutch elements (552, 553) are free-wheeling. The third shaft (73) is here locked to the second outer carrier (203).

In FIG. 5e, the third inner clutch element (551) is disengaged from the third common clutch element (550), while the fourth first and second clutch elements (552, 553) are engaged, so that the second outer carrier (203) is locked to the main shaft (5).

EMBODIMENTS OF THE INVENTION

Figure 1A:
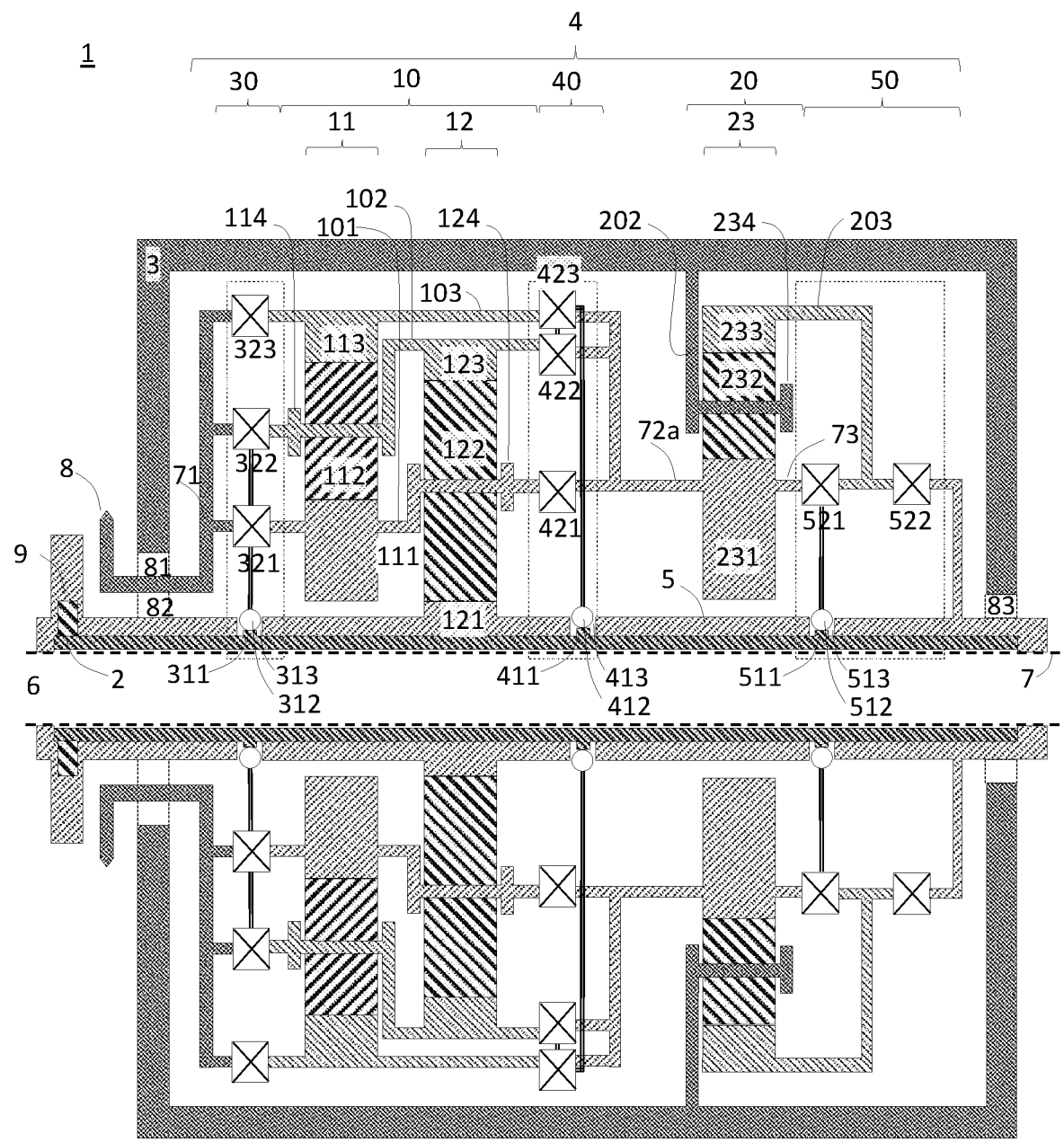
FIG. 1a illustrates a schematic view of an embodiment of the multi speed gear system of the invention. The main shaft (5) is arranged to be fixed to frame ends of a pedally propelled vehicle by a through bolt (7), and the gear mechanisms (4) transfers torque from the first shaft (71), in this case directly connected to a chain cog (8) to the hub shell (3). In this embodiment the gear mechanism (4) comprises a first gear section (10) and a second gear section (20) interconnected by a second shaft (72), where the second gear section (20) is a reduction gear. The first gear section (10) comprises first and a second planetary gear sets (11, 12) interconnected by first inner, middle, and outer carriers (101, 102, 103). Radially operated first and second shift mechanisms (30, 40) are arranged to provide releasable one way couplings between the input shaft (71) and the carriers (101, 102, 103), and between the carriers (101, 102, 103) and the second shaft (72), respectively. This gear system may have a total of 14 different gear ratios. Some elements not belonging to the same cross section in a real embodiment have been added here to illustrate the principle of operation.

In the following description, various examples and embodiments of the invention are set forth in order to provide the skilled person with a more thorough understanding of the invention. The specific details described in the context of the various embodiments and with reference to the attached drawings are not intended to be construed as limitations. Rather, the scope of the invention is defined in the appended claims.

Most of the embodiments described below are indexed. In addition, dependent embodiments defined in relation to the numbered embodiments are described. Unless otherwise specified, any embodiment that can be combined with one or more numbered embodiments may also be combined directly with any of the dependent embodiments of the numbered embodiment(s) referred to.

Gear Sections

In the embodiment illustrated in FIG. 1, the invention is a multispeed internal gear system (1) comprising a main shaft (5), a hub shell (3) rotatably mounted onto said main shaft (1), a gear mechanisms (4), driven by a cog (8) and in turn driving the hub shell (3). The main shaft (5) is arranged to be fixed to a frame of a vehicle, while the hub shell (5) is arranged to be fixed to a rim of the vehicle.

A hollow, selectively operable rotatable shift axle (2) is radially arranged within the main shaft (5), and centrally within the shift axle (2) is a tunnel (6) for receiving a slidedly mounted through-bolt (not shown), for fixing the main shaft (5) to the frame.

A first shaft (71) is coaxially and rotatably mounted between the main shaft (5) and the hub shell (3) by means of an inbound first inner bearing (81) between the main shaft (5) and the first shaft (71), and a first outer bearing (82) between the first shaft (71) and the hub shell (3). The cog (8) drives the first shaft (71).

The gear mechanisms (4) may comprise a first gear section (10) with cascade-coupled first and second epicyclical gear sets (11, 12).

The first epicyclical gear set (11) comprises a first sun gear, first planetary gears, and a first ring gear (111, 112, 113), and the second epicyclical gear set (11) comprises a second sun gear, second planetary gears, and a second ring gear (121, 122, 123). The first planetary gears (112) are rotatably mounted to a first planet holder (114), and the second planetary gears (122) are rotatably mounted to a second planet holder (124). The first and second planet holders (114, 124) are concentric with respect to the main shaft (5).

The second sun gear (121) is nonrotatably fixed to the main shaft (5).

The first gear section (10) further comprises three concentric carrier elements: a first inner carrier (101), interconnecting the first sun gear (111) with the second planet holder (124), a first middle carrier (102), interconnecting the first planet holder (114) with the second ring gear (123), and a first outer carrier (103), connected to the first ring gear (113).

The first ring gear (113) is provided as part of the first outer carrier (103), the second ring gear (123) and the first planet holder (114) are provided as part of the first middle carrier (102), and the second planet holder (124) and the first sun gear (111) are provided as part of the first inner carrier (101).

The three concentric carrier elements (101, 102, 103) rotate with thereinbetween fixed drive ratios around the main shaft (1), where the first outer carrier (103) rotates faster than the first middle carrier (102), and the first middle carrier (102) rotates faster than the first inner carrier (101).

The second gear section (20) is working as a reduction gear, and comprises a third epicyclical gear set (23), comprising a third sun gear, third planetary gears and a third ring gear (231, 232, 233). The third planetary gears (232) are rotatably mounted to a third planet holder (234), nonrotatably connected to the hub shell (3), transferring the output torque to the wheel connected to the hub shell (3). The third planet holder (234) is concentric with respect to the main shaft (5).

The first and second gear sections (10, 20) are interconnected by a second shaft (72a), concentrically encircling the main shaft (1), and arranged for transferring torque from any of the first inner, middle or outer carriers (101, 102, 103) to the third sun gear (231), which the second shaft (72a) is non-rotatably connected to.

Shift Mechanism

In FIG. 1, the gear mechanism (4) is operated by a first, second, and third shift mechanism (30, 40, 50), illustrated partly schematically inside dotted lines.

The shift axle (2) has first, second, and third radial shift cams (311, 411, 511) arranged circumferentially around the shift axle (2), and operating first, second, and third shift balls (312, 412, 512) radially, through first, second, and third openings (313, 413, 513) in the main shaft (5).

Figure 1B:
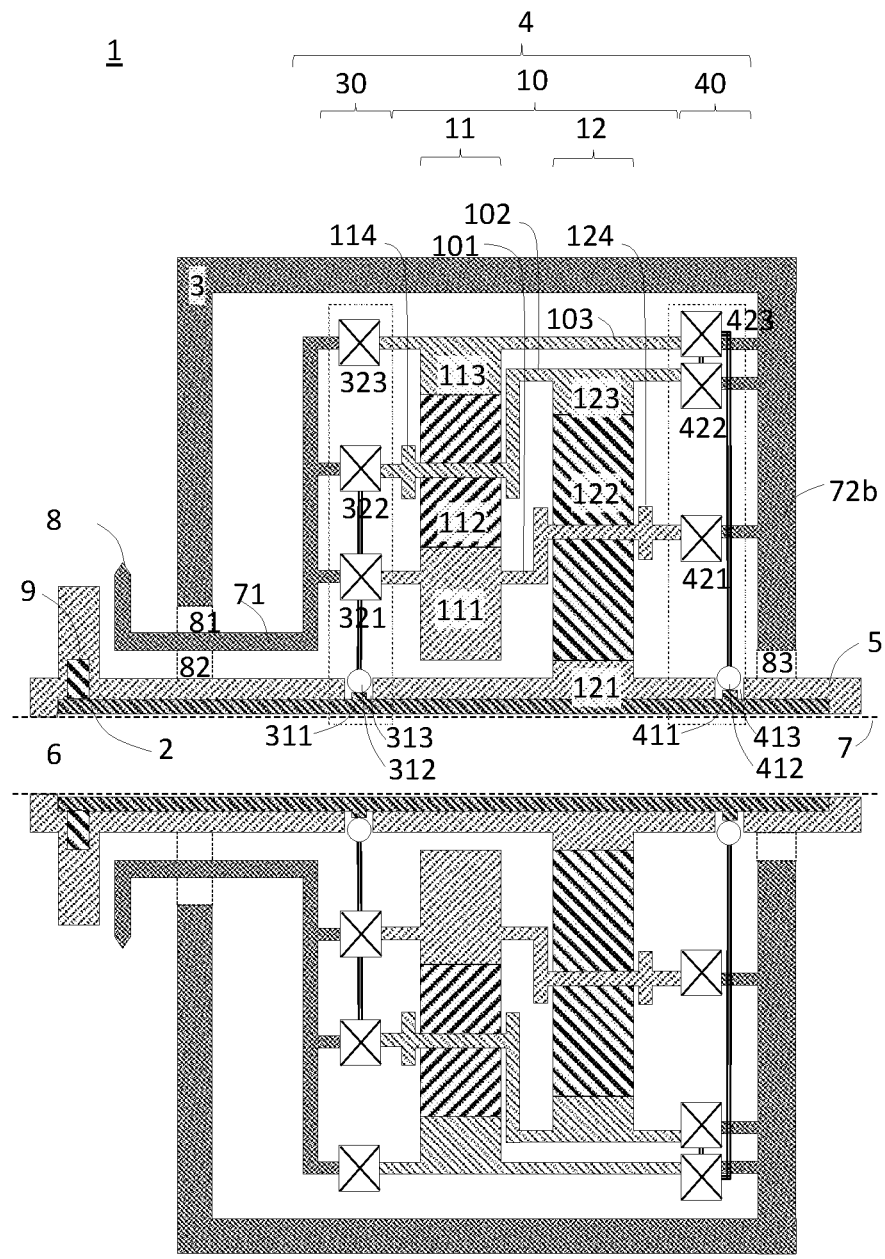
FIG. 1b illustrates an embodiment of the multi speed gear system similar to the system illustrated in FIG. 1a, the difference being that there is no reduction gear and that the second shaft (72b) is directly connected to or integrated with the hub shell (3). This gear system may have a total of 7 different gear ratios.
Figure 2:
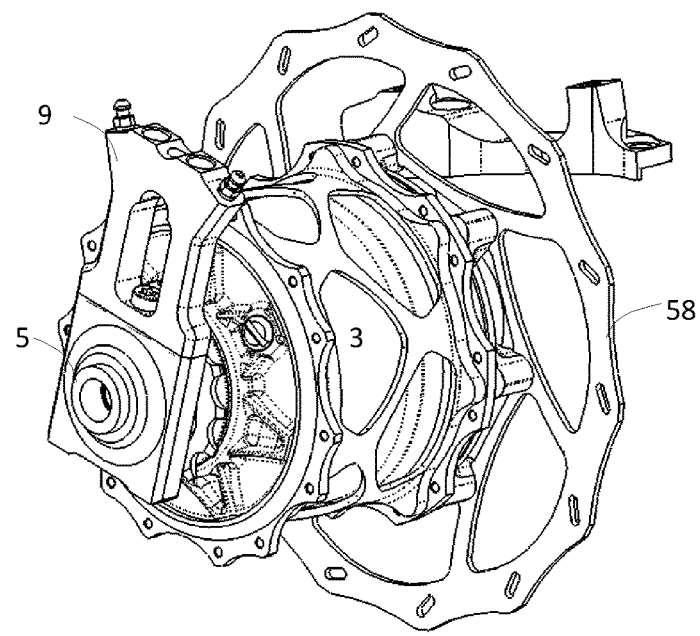
FIG. 2 illustrates in a perspective view a multi speed gear system of an embodiment of the invention.
Figure 3:
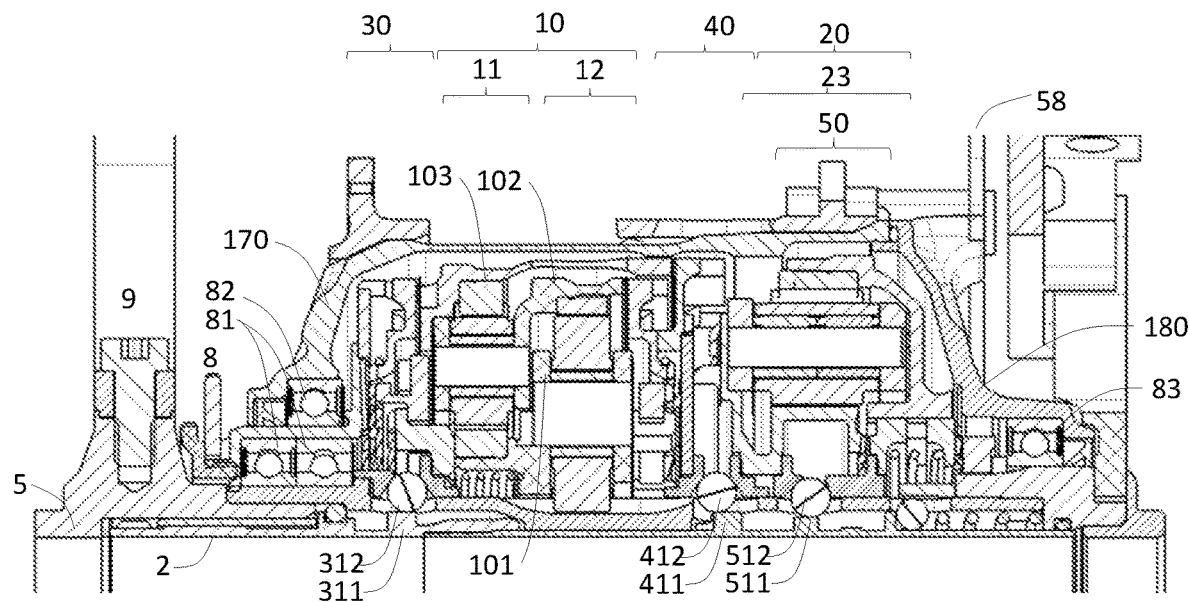
FIG. 3 illustrates half of a cross section of the multi speed gear system of the invention.
Figure 12A:
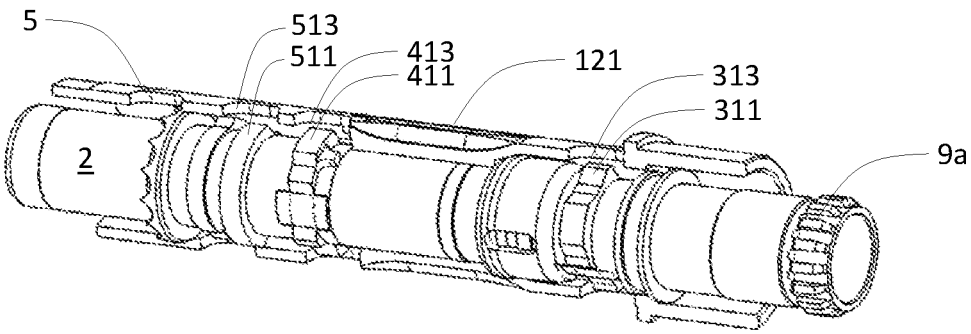
FIG. 12a, 12b, 12c illustrate in perspective and partly cut-away views the shift axle (2) arranged inside the main shaft (5).
Figure 12B:
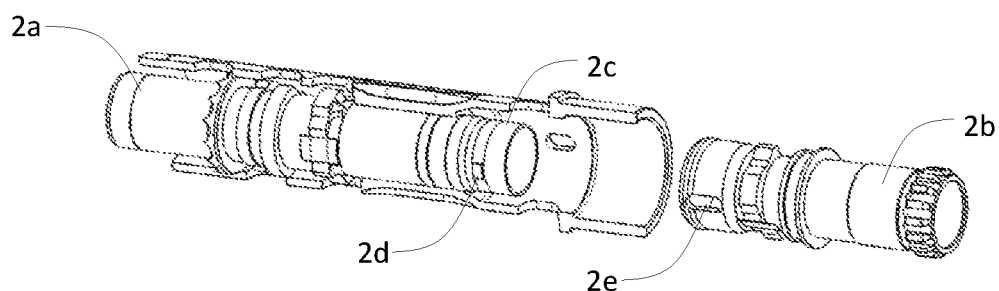
Figure 12C:
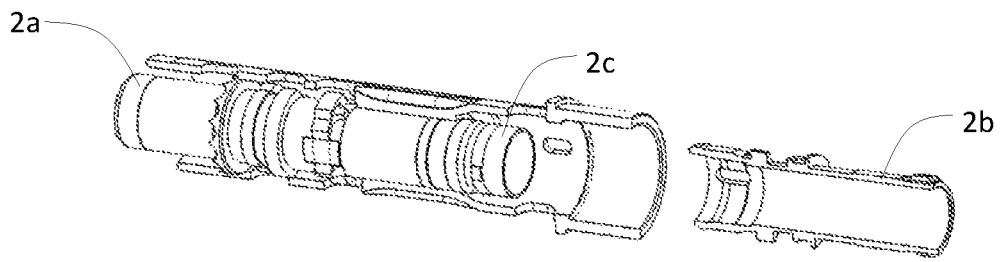

The height of the first, second, and third radial shift cams (311, 411, 511) vary along the circumference of the shift axle (2) and the cams are thus multilevel. The distance the shift balls (312, 412, 512) are pushed radially therefore depends on the angular position of the shift axle (2). A shift mechanism (9) is arranged to rotate the shift axle (2) to the right position. In FIGS. 1a and 1b the interior of the shift mechanism (15) is not shown, but it typically comprises an actuator arranged to rotate the shift axle (2). The shift axle (2) may have a shift wheel (9a), such as a toothed wheel, as illustrated in FIG. 12a, interfacing clutch arms of the actuator. It could also be operated by other means, such as chains belts etc.

The actual implementation of the first, second, and third shift mechanisms (30, 40, 50) will be explained later, but for illustration purposes, individual, first, inner, middle, and outer clutches (321, 322, 323) have been shown schematically in FIG. 1 for the first shift mechanism (30).

The first, inner, middle, and outer clutches (321, 322, 323) are arranged to releasably engage the first shaft (71) with the first, second, or third carrier elements (101, 102, 103), respectively. The radial position of the first ball (312) determines which of the first inner, middle, and outer clutches (321, 322, 323) that is/are operated.

Individual, second inner, middle, and outer clutches (421, 422, 423) have been illustrated in the same way for the second shift mechanism (40).

The second, inner, middle, and outer clutches (421, 422, 423) are arranged to releasably engage the second shaft (72a) with the first, second, or third carrier elements (101, 102, 103), respectively. The radial position of the second ball (412) determines which of the second inner, middle, and outer clutches (421, 422, 423) that is/are operated.

Third first and second clutches (521, 522) are illustrated to the right in FIG. 1 for the third shift mechanism (50). The third first and second clutches (521, 522) are configured, in a direct drive mode, to lock the third sun gear (231) to the third ring gear (233). In reduction mode, the connection between third sun gear (231) and the third ring gear (233) is disengaged, where the third ring gear (233) is held stationary with regard to the main shaft (5) and the second gear section (20) is operating with a reduction in gear ratio between the second shaft (72a) and the hub shell (3).

The actual implementation of the clutches and their operation will now be described in more detail.

Figures 4A, 4B, 4C:
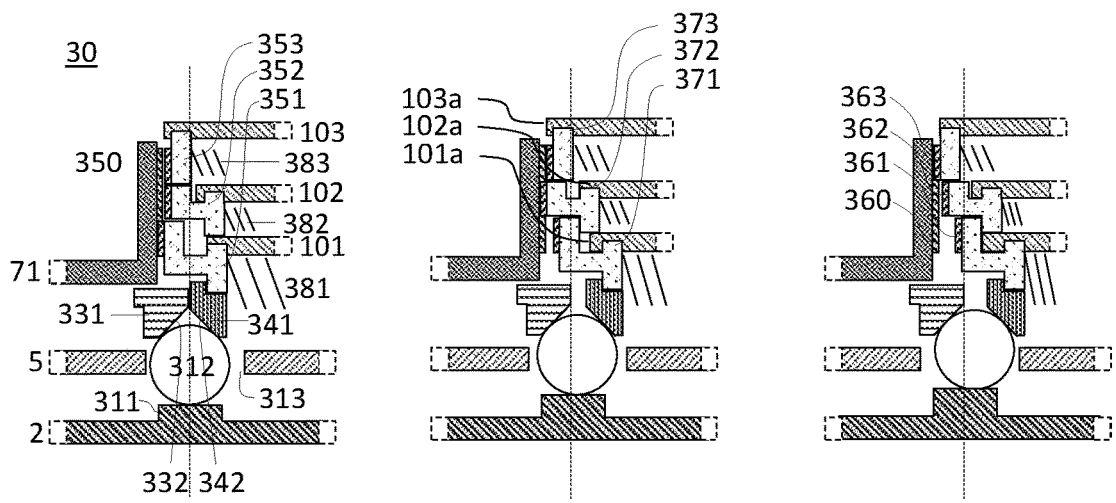
FIGS. 4a, 4b, and 4c illustrate different positions of the clutches of the first shift mechanism (30).

FIG. 4a illustrates components of the first shift mechanism (30).

Some of the components have already been mentioned above, with reference to FIG. 1, such as the stationary main shaft (5), the first shaft (71), rotatably arranged about the main shaft (5), and the shift axle (2). Further, the first inner, middle, and outer carriers (101, 102, 103) can be seen. These carriers are also arranged to rotate about the main shaft (5).

The first shift mechanism (30) comprises on the inbound side a multilevel first inbound clutch element (350) and on the outbound side, first inner, middle, and outer clutch elements (351, 352, 353). The multilevel first inbound clutch element (350) is here extending radially and integrated with the first shaft (71). The first inner, middle, and outer clutch elements (351, 352, 353) interact with the first inner, middle, and outer carriers (101, 102, 103), respectively. For the understanding of the operation of the clutches, it is important to note how this interaction works.

First of all, each of the first inner, middle, and outer clutch elements (351, 352, 353) is rotationally fixed to the corresponding first inner, middle, and outer carrier (101, 102, 103). This has been illustrated in FIG. 4a with the upper parts of clutch elements overlapping the carriers. This means that one of the clutch elements is rotated, the corresponding carrier will rotate and vice-versa.

However, in the axial direction, the clutch elements are allowed to move a certain distance relative the carrier elements which are fixed in the axial direction relative the main shaft (5).

The clutch elements are therefore always rotationally fixed to the carriers, but may be axially moved in and out of engagement with the inbound clutch element (350).

The first inner, middle, and outer clutch elements (351, 352, 353) are pre-tensioned into engagement by corresponding first inner, middle, and outer resilient members (381, 382, 383) illustrated in FIG. 4a.

The collection of the multilevel first common clutch element (350) and the first inner clutch element (351) may be said to constitute the first inner clutch (321) illustrated in FIG. 1. Similarly, the collection of the multilevel first inbound clutch element (350) and the first middle clutch element (352) may be said to constitute the first middle clutch (322), and the collection of the multilevel first inbound clutch element (350) and the first outbound outer clutch element (353) may be said to constitute the first outer clutch (323).

The first inner, middle, and outer clutches (321, 322, 323) are all one-directional dog clutches and the first common clutch element (350) comprises one way first clutch teeth (360) facing towards the first inner, middle, and outer clutch elements (351, 352, 353), each comprising one way first inner, middle, and outer clutch teeth (361, 362, 363) at non-identical radiuses. The number of clutch teeth may be identical for the clutch elements. Since the teeth are one-way, the first inner, middle, and outer clutch (321, 322, 323) may therefore grip in one rotational direction and freewheel in the opposite direction when in an engaged axial position.

Further, the first shift mechanism (30) comprises an axially stationary first assist ring (331) and an axially movable first shift ring (341).

The first assist and first shift rings (331, 341) both have respective first assist and first shift conical surfaces (332, 342) interfacing the first shift ball (312) on axially opposite sides.

The multilevel first radial shift cam (311) is circumferentially arranged around the shift axle (2), and the first shift ball (312) is resting onto said first radial shift cam (311) within the first opening (313) of the main shaft (5).

It can also be seen that the first inner clutch element (351) is configured to move axially with the first shift ring (341) in the outbound direction, and the first outbound middle clutch element (352) is configured to move with the first outbound inner clutch element (351) in the same direction. The first inner clutch element (351) and the first shift ring (341) could in an embodiment be provided as a single element.

The operation of the first shift mechanism will now be explained with reference to FIGS. 4a, 4b and 4c. The same reference signs as in FIG. 4a apply to FIGS. 4b and 4c.

Before explaining how the clutches operate, it is important to understand that, due to the design of the multispeed gear system (1), the first outer carrier (103) will always rotate faster than the first middle carrier (102), which will rotate faster than the first inner carrier (101). It is therefore not possible to have more than one clutch element actively driving a carrier at the time.

In FIG. 4a, the shift axle (2) is positioned so that the first radial shift cam (311) is in its inner position, while the shift axle in FIG. 4b has been rotated to position the first radial shift cam (311) in a middle position. In FIG. 4c the radial shift cam (311) is arranged in an outer position as a result of further rotation of the shift axle (2).

When the radial shift cam (311) is in the inner position, as illustrated in FIG. 4a, the first shift ball (312) is in the lower position. This allows the inner resilient element to force the first shift ring (341) and the first inner clutch element (351) towards the first inbound clutch element (350). The first inner clutch element (351) is therefore in engagement with the first common clutch element (350), and can in this case be defined as the driving element, transferring torque from the first shaft (71) to the first inner carrier (101).

However, the first middle and outer clutch elements (352, 353) are also forced towards the first common clutch element (350), but since they rotate with a higher rotational speed than the first inner clutch element (351), they will freewheel.

In FIG. 4b, the radial shift cam (311) lifts the first shift ball (312) to a middle position. The first shift ball (312) will abut the assist and shift conical surfaces (332, 342) and force the first assist and shift rings (331, 341) apart. However, since only the first shift ring is (341) is movable, the entire axial movement as a result of the radial shift cam (311) lifting the first shift ball (312), has to be taken up by the first shift ring (341).

Since the first shift ring (341) is axially engaged with the first inner clutch element (351), the first inner clutch element (351) is axially moved out of engagement with the first common clutch element (350) to a disengaged position. The axial force from the shift mechanism has to overcome the force of the first inner resilient element (381). This allows the first middle clutch element (352), that was initially freewheeling, to engage, with the first common clutch element (350) by the help of the first middle resilient element (382), and to become the driving element, transferring torque from the first shaft (71) to the first middle carrier (102). However, the first outer clutch element (353) will still freewheel since it rotates faster than the first middle clutch element (352).

Moving on to FIG. 4c, the radial shift cam (311) lifts the first shift ball (312) further to an upper position. The first shift ball (312) will force the first assist and shift rings (331, 341) further apart, a movement that has to be taken up by the first shift ring (341) as explained above.

The first inner clutch element (351) is axially moved further in the outbound direction, and since the first inner clutch element (351) is axially engaged with the first middle clutch element (352), the first middle clutch element (352) is forced out of engagement with the first common clutch element (350) to a disengaged position. The axial force from the shift mechanism has to overcome the force of the first middle resilient element (382). This allows the first outer clutch element (353), that was initially freewheeling, to engage, with the first common clutch element (350) by the help of the first outer resilient element (383), and to become the driving element, transferring torque from the first shaft (71) to the first outer carrier (103).

As can be seen, the first outbound clutch teeth (361, 362, 363) are arranged to appear to form an axially, relatively planar surface extending relatively perpendicular to the main shaft (5).

As described above, the first inner, middle, and outer clutch elements (351, 352, 353) have an axial degree of freedom, so that they can engage and disengage with the axially fixed common clutch element (350) by an axial movement.

In order to allow this axial movement, the back side of the inner, middle, and outer clutch elements (351, 352, 353), opposite the first outbound clutch teeth (361, 362, 363), comprises first inner, middle, and outer clutch engagement means (371, 372, 373), arranged to rotationally engage with corresponding first inner, middle, and outer carrier engagement means (101a, 102a, 103a) of the first inner, middle, and outer carriers (101, 102, 103), respectively. In the illustrated embodiment, the clutch and carrier engagement means are axially directed slots and ears. The reference number have been indicated in FIG. 4b, and in FIGS. 4a, 4b and 4c, it can be observed how the clutch and carrier engagement means (371, 372, 373, 101a, 102a, 103a) slide axially relative each other when the clutch is operated and the clutches are freewheeling.

Figures 5A, 5B, 5C:
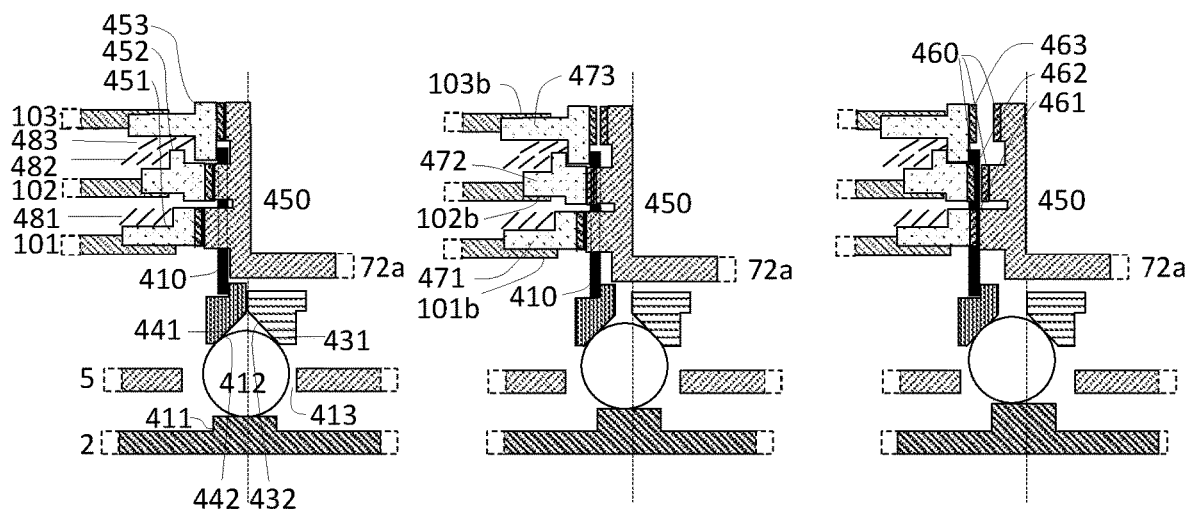
FIGS. 5a, 5b, and 5c illustrate different positions of the clutches of the second shift mechanism (40).

FIG. 5a illustrates components of the second shift mechanism (40).

Some of the components have already been mentioned above, with reference to FIG. 1, such as the stationary main shaft (5), the first shaft (71), rotatably arranged about the main shaft (5), and the shift axle (2). Further, the first inner, middle, and outer carriers (101, 102, 103) can be seen. These carriers are also arranged to rotate about the main shaft (5).

The second shift mechanism (40) comprises on the inbound side second inner, middle, and outer clutch elements (451, 452, 453), and on the outbound side a multilevel second common clutch element (450). The multilevel second common clutch element (450) is here extending radially and integrated with the second shaft (72a). The first inner, middle, and outer clutch elements (451, 452, 453) interact with the first inner, middle, and outer carriers (101, 102, 103), respectively. For the understanding of the operation of the clutches, it is important to note how this interaction works.

First of all, each of the second inner, middle, and outer clutch elements (451, 452, 453) are rotationally fixed to the corresponding carriers. This has been illustrated in FIG. 5a with the upper parts of clutch elements overlapping the carriers. This means that if the clutch element is rotated, the corresponding carrier will rotate and vice-versa.

However, in the axial direction, the second inner, middle, and outer clutch elements (451, 452, 453) are allowed to move a certain distance relative the respective first inner, middle, and outer carriers (101, 102, 103) which are fixed in the axial direction relative the main shaft (5).

The second inner, middle, and outer clutch elements (451, 452, 453) of the second shift mechanism (40) are therefore always rotationally fixed to the carriers, but may be axially moved in and out of engagement with the second common clutch element (450).

The second inner, middle, and outer clutch elements (451, 452, 453) are pre-tensioned into engagement by corresponding second inner, middle, and outer resilient members (481, 482, 483) illustrated in FIG. 5a.

The collection of the multilevel second common clutch element (450) and the second inner clutch element (451) may be said to constitute the second inner clutch (421) illustrated in FIG. 1. Similarly, the collection of the multilevel second common clutch element (450) and the second middle clutch element (452) may be said to constitute the second middle clutch (422), and the collection of the multilevel second common clutch element (450) and the second outer clutch element (453) may be said to constitute the second outer clutch (423).

The second inner, middle, and outer clutches (421, 422, 423) are all one-directional dog clutches and the second common clutch element (450) comprises one way second clutch teeth (460) facing towards the second inner, middle, and outer clutch elements (451, 452, 453), each comprising an identical number of corresponding one way second inner, middle, and outer clutch teeth (461, 462, 463) at non-identical radiuses. Since the teeth are one-way, the second inner, middle, and outer clutches (421, 422, 423) may therefore grip in one rotational direction and freewheel in the opposite direction when in an engaged axial position.

Further, the second shift mechanism (40) comprises an axially stationary second assist ring (431) and an axially movable second shift ring (441).

The second assist and shift rings (431, 441) both have respective second assist and shift conical surfaces (432, 442) interfacing the second shift ball (412) on axially opposite sides.

The multilevel second radial shift cam (411) is circumferentially arranged around the shift axle (2), and the second shift ball (412) is resting onto said second radial shift cam (411) within the second opening (413) of the main shaft (5).

The second outer clutch element (453) is configured to move axially with the second shift ring (441) away from the second common clutch element (450) when operated. Further, the second middle clutch element (452) is configured to move with the second outer clutch element (453) in the same direction. The second outer clutch element (453) and the second shift ring (441) could in an embodiment be provided as a single element.

The operation of the second shift mechanism will now be explained with reference to FIGS. 5a, 5b and 5c. The same reference signs as in FIG. 5a apply to FIGS. 5b and 5c, and vice-versa.

Where the first shift mechanism (30) is on the inward side of the first gear section (10), the inward clutches, i.e. the first inner, middle or outer clutches (321, 322, 323) are driving the corresponding carrier. However on the outward side of the first gear section (10), it is opposite, and it is the carriers that drive the corresponding second inner, middle or outer clutches (421, 422, 423) of the second shift mechanism (40). As stated above for the first shift mechanism, the first outer carrier (103) will always rotate faster than the first middle carrier (102) which will rotate faster than the first inner carrier (101). It is therefore not possible to have more than one carrier actively driving a clutch element at the time.

However, in order to obtain transmission of torque through the second shift mechanism (40), the clutches operate differently from the first gear mechanism (30). In the first shift mechanism (30), the first middle and outer clutch elements (352, 353) were freewheeling when the first inner clutch element (351) was the driving element. In the second shift mechanism (40), it is opposite. Here, the second inner and middle clutch elements (451, 452) are freewheeling when the second outer clutch element (453) is the driving element.

In order to obtain this, the second shift mechanism (40) comprises an axially movable second shift element (410), axially engaged with the second outer clutch element (453), but free to move axially relative the second inner and middle clutch elements (451, 452), indicated by the dashed line in FIGS. 5a, 5b and 5c.

In FIG. 5a, the shift axle (2) is positioned so that the second radial shift cam (411) is in its inner position, while the shift axle (2) in FIG. 5b has been rotated to position the second radial shift cam (411) in a middle position. In FIG. 5c the second radial shift cam (411) is arranged in an outer position as a result of further rotation of the shift axle (2).

When the second radial shift cam (411) is in the inner position, as illustrated in FIG. 5a, the second shift ball (412) is in the lower position. This allows the second outer resilient element (483) to force the second outer clutch element (453) towards the second common clutch element (450). The second outer clutch element (453) is therefore in engagement with the second common clutch element (450), and can in this case be defined as the driving element, transferring torque from the outer carrier (103) to the second shaft (72a).

However, the second middle and inner clutch elements (452, 451) are also forced towards the second common clutch element (450) by their respective second middle and inner resilient elements (482, 481), but they will freewheel.

In FIG. 5b, the second radial shift cam (411) is rotated and lifts the second shift ball (412) to a middle position. The second shift ball (412) will abut the second assist and shift conical surfaces (432, 442) and force the second assist and second shift rings (431, 441) apart. However, since only the second shift ring (441) is movable, the entire axial movement, as a result of the second radial shift cam (411) lifting the second shift ball (412), has to be taken up by the second shift ring (441).

The second shift element (410) is axially movable and engaged with the second shift ring (441). When the second shift ring (441) is moved axially, it will force the second outer clutch element (453) out of engagement from the second common clutch element (450) to a disengaged position. The axial force from the shift mechanism has to overcome the force of the second outer resilient element (483). This allows the second middle clutch element (452), that was initially freewheeling, to engage with the second common clutch element (450), by the help of the second middle resilient element (482), and to become the driving element, transferring torque from the first middle carrier (102) to the second shaft (72a). However, the second inner clutch element (451) will still freewheel.

Moving on to FIG. 5c, the second radial shift cam (411) lifts the second shift ball (412) further to an upper position. The second shift ball (412) will force the second assist and shift rings (431, 441) further apart, a movement that has to be taken up by the second shift ring (441) as explained above.

The second shift element (410) will force the second outer clutch element (453) further away from engagement, and since the second outer clutch element (453) is axially engaged with the second middle clutch element (452), the second middle clutch element (452) is forced out of engagement from the second common clutch element (450), to a disengaged position.

The axial force from the shift mechanism has to overcome the force of the second middle resilient element (482). This allows the second inner clutch element (451), that was initially freewheeling, to engage with the second common clutch element (450) by the help of the second outer resilient element (483), and to become the driving element, transferring torque from the first inner carrier (101) to the second shaft (72a).

As described above, the second inner, middle, and outer clutch elements (451, 452, 453) have an axial degree of freedom, so that they can engage and disengage with the axially fixed second common clutch element (450) by an axial movement.

In order to allow this axial movement, the back side of the second inner, middle, and outer clutch elements (451, 452, 453), opposite the second outbound clutch teeth (461, 462, 463), comprises second inner, middle, and outer clutch engagement means (471, 472, 373), arranged to rotationally engage with corresponding second inner, middle, and outer carrier engagement means (101b, 102b, 103b) of the first inner, middle, and outer carriers (101, 102, 103), respectively.

In the illustrated embodiment, the clutch and carrier engagement means are axially directed slots and ears. The reference numbers have been indicated in FIG. 5b, and in FIGS. 5a, 5b and 5c, it can be observed how the clutch and carrier engagement means (471, 472, 473, 101b, 102b, 103b) slide axially relative each other when the clutch is operated and the clutches are freewheeling.

The third shift mechanism (50), shifting the second gear section (20), comprises a third clutch (521) and a fourth clutch (522) as seen in FIG. 1a. The third clutch (521) is operable between an engaged and disengaged state, and the fourth clutch (522) is an always engaged clutch freewheeling in non-torque-transferring direction.

In the same way as for the first and second shift mechanisms (30, 40), the third shift mechanism (50) has a third radial shift cam (511), operating a third shift ball (512).

Figures 5D, 5E:
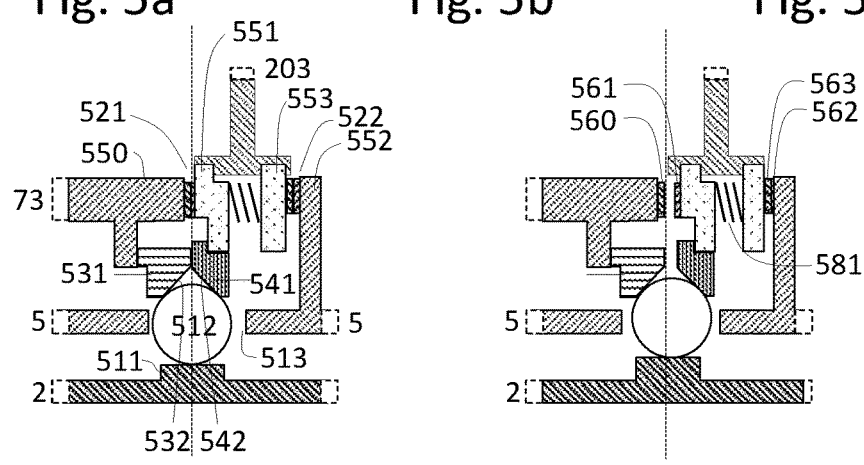
FIGS. 5d and 5e illustrate different positions of the third and fourth clutches (521, 522) of the third shift mechanism (50).
Figures 6A, 6B:
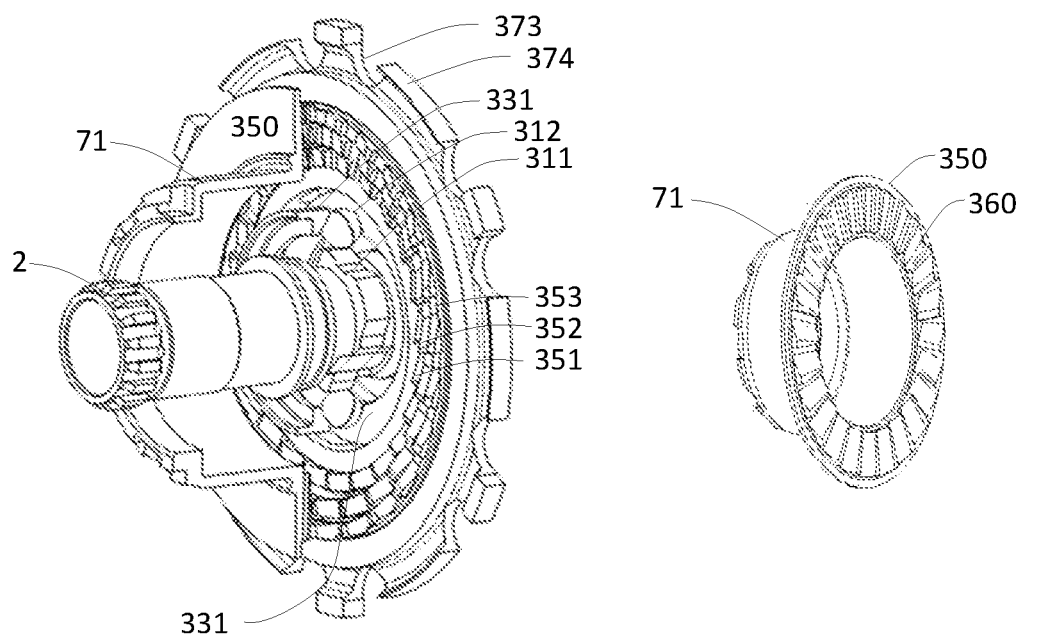
FIGS. 6a, 6b, 6c, 6d, 6e and 6f illustrate in perspective and partly cut away views, some elements related to the first shift mechanism (30) of an embodiment of the invention.
Figures 6C, 6D:
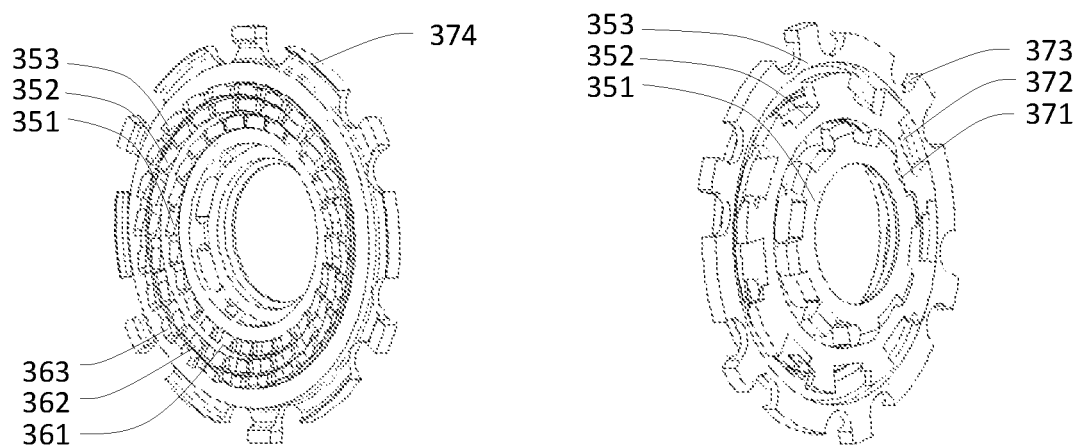
Figure 6E:
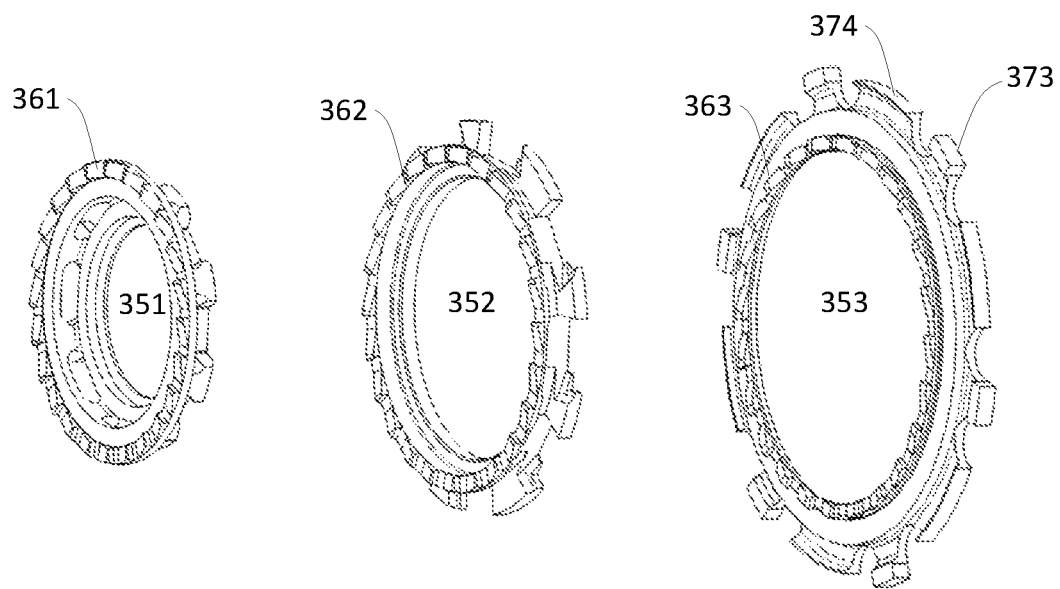
Figure 6F:
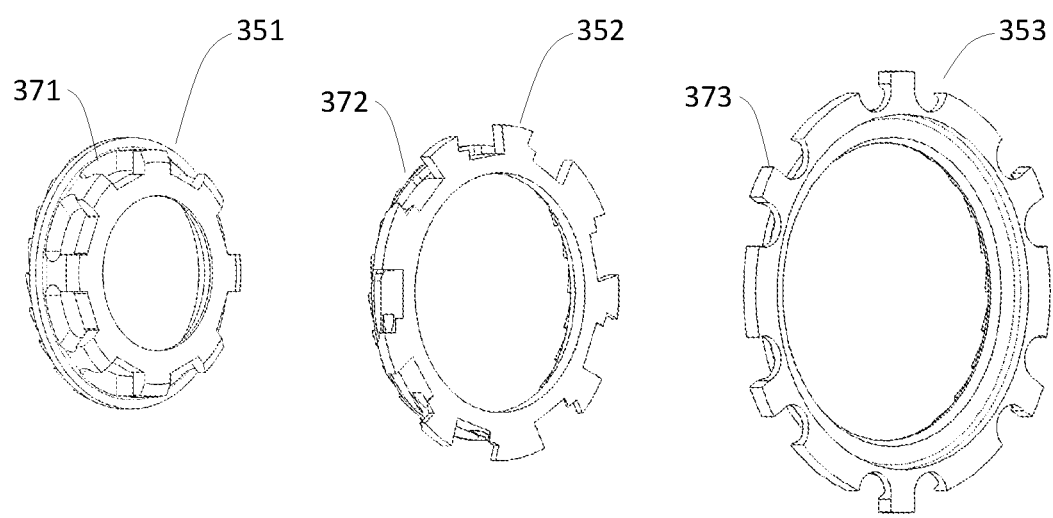

In FIGS. 5d and 5e, more details about the third shift mechanism are illustrated: the stationary main shaft (5), the third shaft (73) rotatably arranged about the main shaft (5), the shift axle (2), the third radial shift cam (511) and the third shift ball (512), described previously. The third radial shift cam (511) operates the third shift ball (512) through the third opening (513) in the main shaft (5).

The collection of the third assist clutch element (550) and third shift clutch element (551) may be said to constitute the third clutch (521), and the collection of the fourth shift clutch element (553) and fourth assist clutch element (552) may be said to constitute the fourth clutch (522) illustrated in FIG. 1.

Figure 7E:
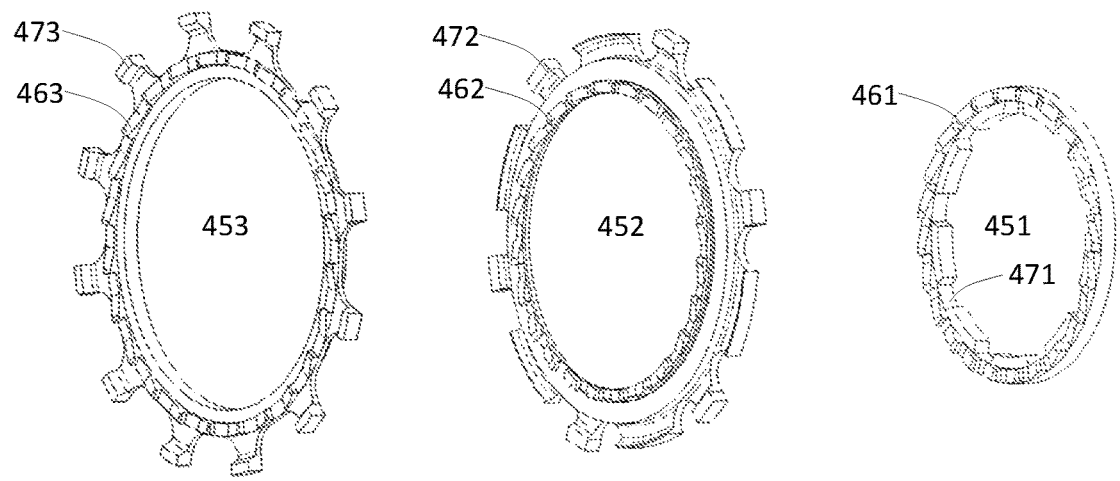
Figure 7F:
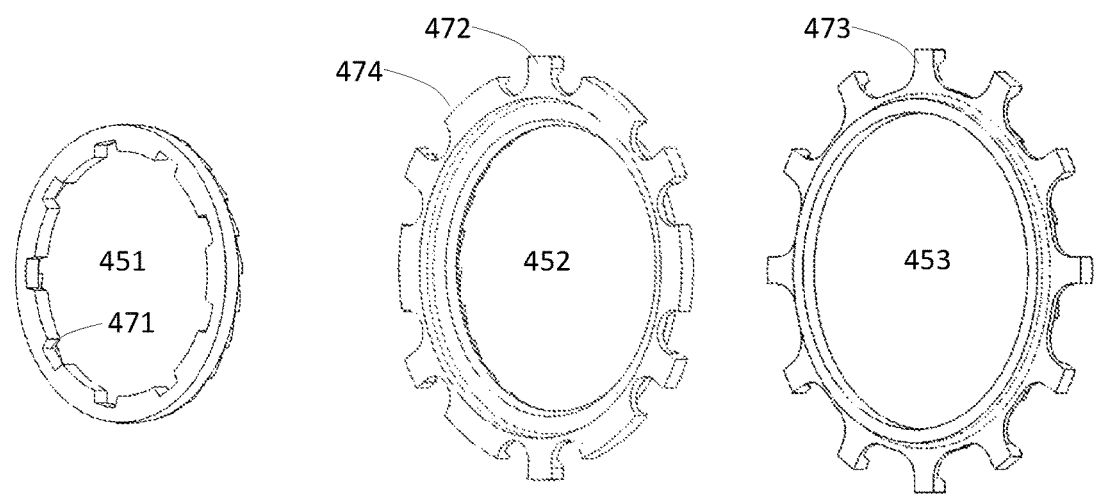
Figures 7G, 7H:
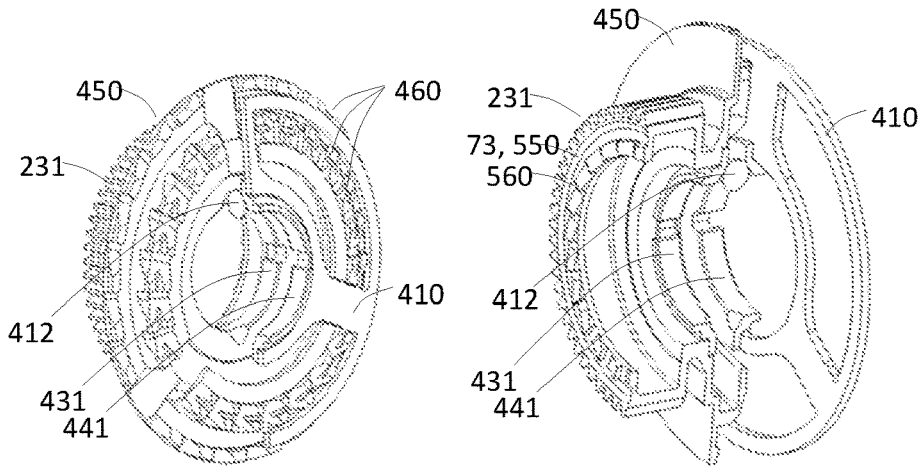
Figures 8A, 8B:
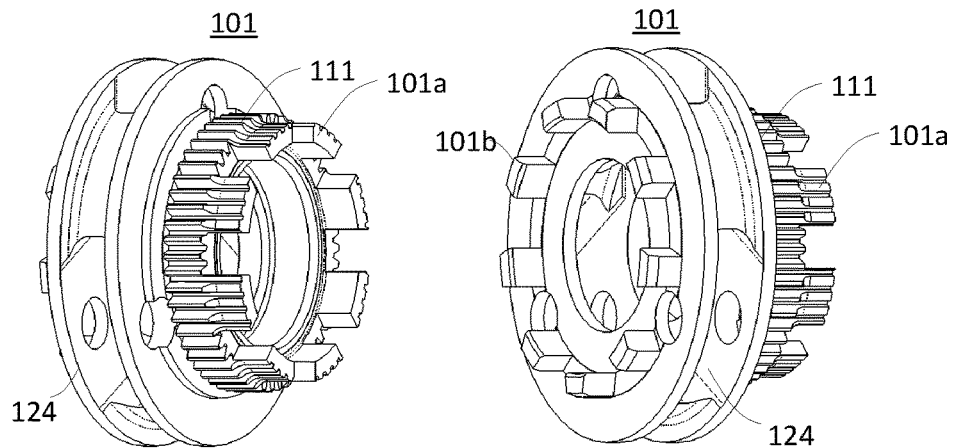
FIGS. 8a and 8b illustrate in perspective views a first inner carrier (101) integrated with the first sun gear (111).
Figures 9A, 9B:
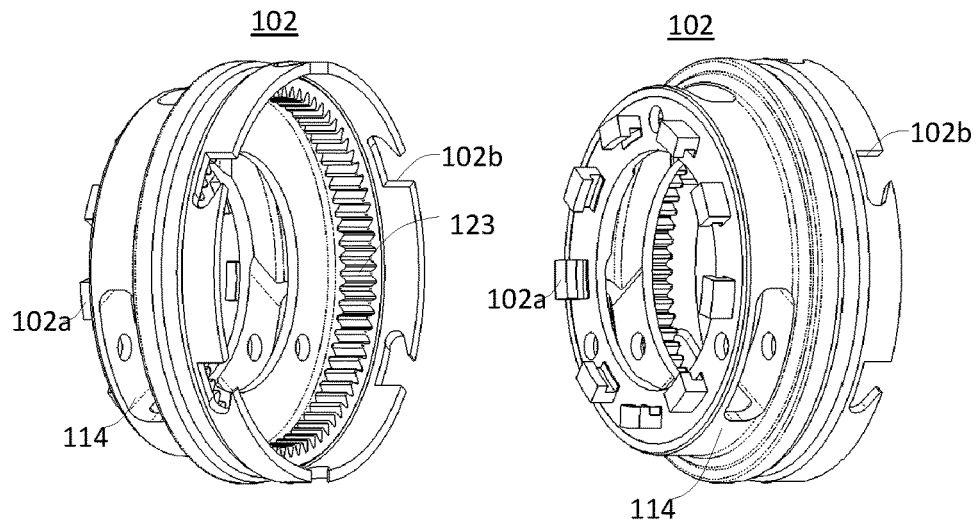
FIGS. 9a and 9b illustrate in perspective views a first middle carrier (102) integrated with the second ring gear (123).
Figure 10A:
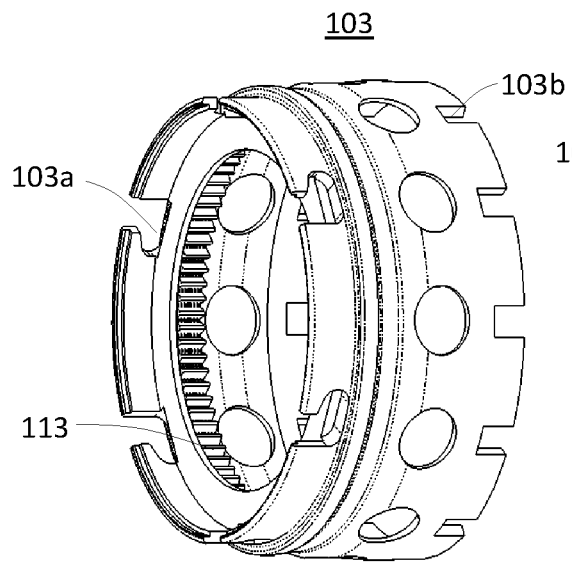
FIGS. 10a and 10b illustrate in perspective views a first outer carrier (103) integrated with the first ring gear (113).
Figure 10B:
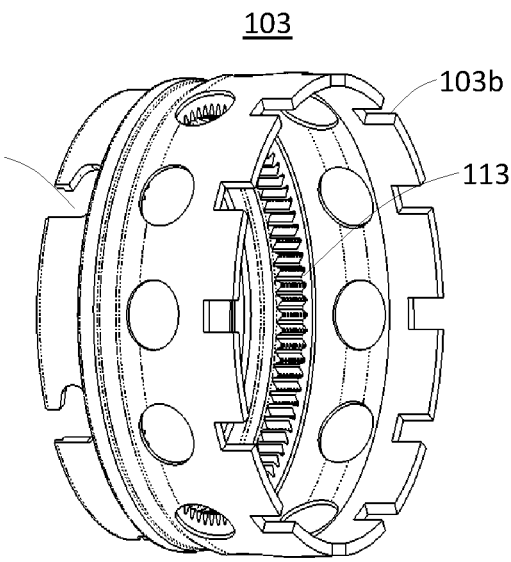
Figure 11:
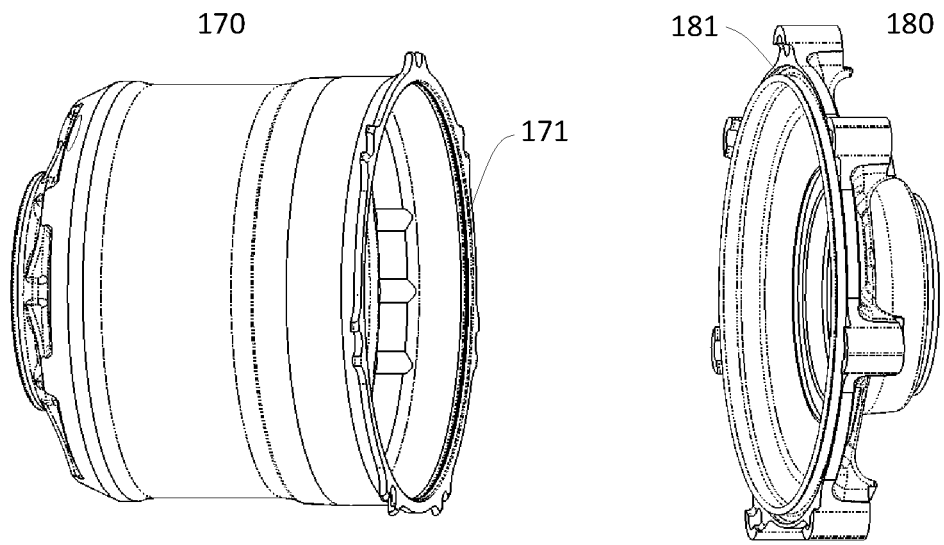
FIG. 11 illustrates in a perspective view a split hub shell (3) of an embodiment of the invention.

The third and fourth clutches (521, 522) are both one-directional dog clutches and the third assist clutch element (550) comprises one way assist clutch teeth (560) as illustrated e.g. in FIG. 7h, facing towards the third shift clutch element (551), comprising in an embodiment an identical number of corresponding one way third shift clutch teeth (561). Likewise, the fourth shift clutch element (553) comprises one way fourth shift clutch teeth (563) facing towards the fourth shift clutch element (552), comprising in an embodiment an identical number of corresponding one way fourth shift clutch teeth (562). Since the teeth are one-way, the third and fourth clutches (521, 522) may therefore grip in one rotational direction and freewheel in the opposite direction when in an engaged position.

In this case the third assist clutch element (550) is integrated with the third shaft (73) and the third sun gear (231), and axially fixed relative the main shaft (5). The second outer carrier (203) is rotationally fixed to the third ring gear (233), as illustrated in FIG. 1. The fourth shift clutch element (552) is axially fixed relative the main shaft (5).

The third shift clutch element (551) and the fourth shift clutch element (553) are rotationally fixed to the second outer carrier (203). This is illustrated in FIGS. 5d and 5e as the upper parts of said clutch elements are overlapping the second outer carrier (203) in the illustration. This means that if the third shift clutch element (551) or the fourth shift clutch element (553) are rotated, the third ring gear (233) will rotate along with them and vice versa. The third shift clutch element (551) is configured to move axially in and out of engagement with its corresponding counterpart, the third assist clutch element (550), while the fourth shift clutch element (553) is arranged to either be engaged with—or freewheel with respect to the fourth assist clutch element (552).

Both the third second clutch element (551) and the fourth first clutch element (552) are pretensioned into engagement by a third resilient element (581).

Further, the third shift mechanism (50) comprises an axially stationary third assist ring (531) and an axially movable third shift ring (541).

The third assist and shift rings (531, 541) have respective third assist and shift conical surfaces (532, 542) interfacing the third shift ball (512) on axially opposite sides.

The multilevel third radial shift cam (511) is circumferentially arranged around the shift axle (2), and the third shift ball (512) is resting onto said third radial shift cam (511) within the third opening (513) of the main shaft (5).

The operation of the third shift mechanism will now be explained with reference to FIGS. 5d and 5e. The same reference signs as in FIG. 5d apply to FIG. 5e.

In FIG. 5d, the shift axle (2) is positioned so that the third radial shift cam (511) is in its inner position, while the shift axle (2) in FIG. 5e has been rotated to position the third radial shift cam (511) in an outer position.

When the third radial shift cam (511) is in the inner position, as illustrated in FIG. 5d, the third shift ball (512) is in the lower position. This allows the third resilient element (581) to force the third second shift ring (541) and the third second clutch element (551) towards the third first clutch element (550). The third second clutch element (551) is therefore in engagement with the third first clutch element (550), and can in this case be defined as the driving element, transferring torque from the third shaft (73) to the third ring gear (233). However, in the fourth clutch (522) the fourth first clutch element (552) is also forced towards the third second clutch elements (553), but it will freewheel. In this position, the third shift mechanism (50) is in direct drive mode.

In FIG. 5e, the third radial shift cam (511) lifts the third shift ball (512) to an upper position. The third shift ball (512) will abut the third first and second conical surfaces (532, 542) and force the third first and third second shift rings (531, 541) apart. However, since only the third second shift ring is (541) is movable, the entire axial movement as a result of the third radial shift cam (511) lifting the third shift ball (512), has to be taken up by the third second shift ring (541). Since the third second shift ring (541) is axially engaged with the third second clutch element (551), the third second clutch element (551) is axially moved out of engagement from the third first clutch element (550) to a disengaged position. The axial force from the shift mechanism has to overcome the force of the third resilient element (581).

In this situation, the third sun gear (231) is no longer driving the third outer carrier (203) and the fourth clutch (522) will stop freewheeling and go into engagement. In this position, the third shift mechanism (50) is in reduction drive mode.

In the following, a number of embodiments with prefix EG of the multi speed gear system are disclosed.

In a first independent embodiment; EG-1, the multi speed gear system (1) comprises a gear mechanism (4) comprising;
a main shaft (5);
a hollow first shaft (71) and a hollow second shaft (72a, 72b), both axially stationary and rotatably arranged about the main shaft (5);

an epicyclical first gear section (10) arranged about the main shaft (5) between the first and second shafts (71, 72), and comprising two radially stacked carrier elements (101, 102), and a first shift mechanism (30) arranged between the first shaft (71) and the first gear section (10), and configured to rotationally engage the first shaft (71) with either of the two radially stacked carriers (101, 102), wherein the first shift mechanism (30) comprises two first clutches (321, 322) radially stacked about the main shaft (5).

EG-2. The multi speed gear system (1) of EG-1, wherein the first gear section (10) comprises first and second epicyclical gear sets (11, 12).

EG-3. The multi speed gear system (1) of EG-2, wherein the first and second epicyclical gear sets (11, 12) comprise respective first and second sun gears (111, 121), planetary gears (112, 122) and ring gears (113, 123).

EG-4. The multi speed gear system (1) of EG-3, wherein the inner carrier (101) interconnects the first sun gear (111) and a second planet holder (124) holding the second planetary gears (122).

EG-5. The multi speed gear system (1) of EG-3 or EG-4, wherein the middle carrier (102) interconnects a first planet holder (114) holding the first planetary gears (112) and the second ring gear (123).

EG-6. The multi speed gear system (1) of any of EG-1 or EG-5, wherein an outer carrier (103) interconnects the second clutch members of the first and second outer clutches (323, 423) and the first ring gear (113).

EG-7. The multi speed gear system (1) of any of EG-1 or EG-6, comprising a second gear section (20) connected to the second shaft (72a, 72b).

EG-8. The multi speed gear system (1) of any of EG-1 or EG-7, wherein the two first clutches (321, 322) have first and second interfacing clutch members, respectively, wherein the first clutch member of the two first clutches (321, 322) are fixed to the first shaft (71) and arranged to remain axially stationary relative the main shaft (5), and the second clutch members of the two first clutches (321, 322), are rotatably connected to the two radially stacked carriers (101, 102), respectively.

EG-9. The multi speed gear system (1) of EG-8, wherein the first clutch members of the two first clutches (321, 322) is an integrated, first common clutch element (350).

EG-10. The multi speed gear system (1) of EG-9, wherein the first common clutch element (350) is integrated with the first shaft (71).

EG-11. The multi speed gear system (1) of any of EG-1 to EG-10, wherein the multi speed gear system (1) comprises;

a second shift mechanism (40) arranged between the first gear section (10) and the second shaft (72a, 72b) configured to rotationally engage the second shaft (72a, 72b) with either of the two radially stacked carriers (101, 102), wherein the second shift mechanism (40) comprises two second clutches (421, 422) radially stacked about the main shaft (5).

EG-12. The multi speed gear system (1) of EG-11, wherein the two second clutches (421, 422) have first and second interfacing clutch members, respectively, wherein the first clutch members of the two second clutches (421, 422) are fixed to the second shaft (72a, 72b) and arranged to remain axially stationary relative the main shaft (5), and the second clutch members of the two second clutches (421, 422), are rotatably connected to the two radially stacked carriers (101, 102), respectively.

EG-13. The multi speed gear system (1) of EG-11 or EG-12, wherein the first clutch members of the two first clutches (421, 422) is an integrated, second common clutch element (450).

EG-14. The multi speed gear system (1) of any of EG-11 or EG-13, wherein the second common clutch element (450) is integrated with the second shaft (72a, 72b).

EG-15. The multi speed gear system (1) of any of EG-11 or EG-14, wherein the second clutch members are axially separated, with the radially inner clutch member extending more in the direction of the first clutch member than the radially inner clutch member.

EG-16. The multi speed gear system (1) of any of EG-11 to EG-15, wherein the second shift mechanism (40) comprises an axially movable second shift element (410), configured to shift the outer of the second clutch members axially from an engaged position to a disengaged position without axially moving the inner clutch member.

EG-17. The multi speed gear system (1) of EG-16, wherein the second common clutch element (450) comprises a radially extending shift opening (409) through the first clutch members, arranged to host the second shift element (410), wherein the second shift element (410) is arranged in the shift opening (409) between the second common clutch element (450) and the first clutch members.

EG-18. The multi speed gear system (1) of any of EG-1 to EG-17, wherein the main shaft (5) is hollow in the axial direction.

EG-19. The multi speed gear system (1) of EG-18, wherein a sun gear (121) of the epicyclical first gear section (10) is integrated with the main shaft (5).

EG-20. The multi speed gear system (1) of EG-18 or 19, wherein the outer diameter of the sun gear (121) of the epicyclical first gear section (10) is equal to or smaller than the outer diameter of the main shaft (5) in the cross section of the first shift mechanism (30).

EG-21. The multi speed gear system (1) of any of EG-18 to EG-20, wherein the main shaft (5) is configured to interface frame ends of a frame of a pedally propelled vehicle and carry loads from the frame.

EG-22. The multi speed gear system (1) of any of EG-18 to EG-21, wherein the multi speed gear system (1) comprises a shift axle (2) arranged inside the main shaft (5), and configured to operate the first and/or second shift mechanism (30, 40) when shift axle (2) is rotated relative the main shaft (5).

EG-23. The multi speed gear system (1) of EG-22, wherein the shift axle (2) is tubular and configured to receive a through bolt (7).

EG-24. The multi speed gear system (1) of any of EG-22 to EG-23, wherein the main shaft (5) comprises shaft ends (5a, 5b) with smaller inner diameter than the inner diameter of the shift axle (2), wherein the shift axle (2) is configured to rotate inside the main shaft (5) when the main shaft (5) is fixed to a vehicle frame with a through bolt (7).

EG-25. The multi speed gear system (1) of any of EG-22 to EG-24, wherein the shift axle (2) comprises first and second shift axle members (2a, 2b) configured to be press-fit together.

EG-26. The multi speed gear system (1) of any of EG-22 to EG-25, wherein the first and second shift axle members (2a, 2b) comprises respective interlocking lock members (2d, 2e), arranged to enter into rotational lock with each other when the first and second shift axle members (2a, 2b) are press fit-together in a specific relative rotational position.

EG-27. The multi speed gear system (1) of any of EG-25 to EG-26, wherein any of the first and second shift axle members (2a, 2b) comprises a guide region (2c) configured to guide the first and second shift axle members (2a, 2b) concentrically, and allowing relative rotation while they are concentrically guided by the guide region, before they are press-fit together.

EG-28. The multi speed gear system (1) of any of EG-25 to EG-27, wherein the first and second shift axle members (2a, 2b) are configured to be entered into opposite ends of the main shaft (5) before press-fit together inside the main shaft (5).

EG-29. The multi speed gear system (1) of any of EG-22 to EG-28, wherein the shift axle (2) comprises a radial first shift cam (311) with multiple radial levels, wherein each level has a specific radius.

EG-30. The multi speed gear system (1) of EG-29, wherein the first shift mechanism (30) is arranged to translate a radial motion of the first radial shift cam (311) into axial movement of the of the first clutch member of the first inner clutch (321).

EG-31. The multi speed gear system (1) of any of EG-29 to EG-30, wherein the first shift cam (311) has three cam levels.

EG-32. The multi speed gear system (1) of any of EG-29 to EG-31, wherein the lowest cam level corresponds to transmission of torque through the first inner clutch (321), the middle cam level corresponds to transmission of torque through the first middle clutch (322) and the outer cam level corresponds to transmission of torque through a first outer clutch (323).

EG-33. The multi speed gear system (1) of any of EG-22 to EG-32, wherein the shift axle (2) comprises a radial second shift cam (411) with multiple levels, wherein each level has a specific radius.

EG-34. The multi speed gear system (1) of EG-33, wherein the second shift mechanism (40) is arranged to translate a radial motion of the second radial shift cam (411) into axial movement of the of the first clutch member of the first middle clutch (422).

EG-35. The multi speed gear system (1) of any of EG-33 to EG-34, wherein the second shift cam (411) has three levels.

EG-36. The multi speed gear system (1) of EG-35, wherein the lowest cam level corresponds to transmission of torque through a second outer clutch (423), the middle cam level corresponds to transmission of torque through the second middle clutch (422) and the outer cam level corresponds to transmission of torque through the second inner clutch (421).

In the next sections, embodiments related to the shifting mechanism will be disclosed.

EG-37. The multi speed gear system (1) of any of EG-29 to EG-32, wherein the main shaft (5) comprises a first opening (313) and the multilevel first radial shift cam (311) is arranged to operate the first shift mechanism (30) through the first opening (313).

EG-38. The multi speed gear system (1) of any of EG-37, wherein the first shift mechanism (30) comprises a first shift ball (312) arranged in the first opening (313), wherein the multilevel first radial shift cam (311) is arranged to operate the first shift ball (311) radially.

EG-39. The multi speed gear system (1) of any of EG-37 to EG-38, the first shift mechanism (30) comprises a first assist ring (331) and a first shift ring (341) arranged on opposite sides of the first shift ball (312), wherein the first shift ring (341) have a first shift conical surface (342) towards the first shift ball (311), and the first shift ball (312) is configured to move the first shift ring (341) axially when the first shift ball (312) is pressed radially against the conical surface.

EG-40. The multi speed gear system (1) of any of EG-37 to EG-39, wherein the first shift ring (341) is interfacing the inner of the second clutch members and is arranged to operate the inner of the second clutch members axially when the first radial shift cam (311) moves from a lower to a higher level.

EG-41. The multi speed gear system (1) of any of EG-37 to EG-40, wherein the inner of the second clutch members is interfacing the outer of the second clutch members, and is arranged to operate the outer of the second clutch members axially from an engaged position to a disengaged position. when the first radial shift cam (311) moves from a middle to an outer level.

EG-42. The multi speed gear system (1) of any of EG-37 to EG-41, wherein the inner of the second clutch members is interfacing the outer of the second clutch members, and is arranged to operate the outer of the second clutch members axially from an engaged position to a disengaged position when the first radial shift cam (311) moves from an lower to a higher level.

EG-43. The multi speed gear system (1) of any of EG-33 to EG-36, wherein the main shaft (5) comprises a second opening (413) and the multilevel second radial shift cam (411) is arranged to operate the second shift mechanism (40) through the second opening (413).

EG-44. The multi speed gear system (1) of EG-43, wherein the second shift mechanism (40) comprises a second shift ball (412) arranged in the second opening (413), wherein the multilevel second radial shift cam (411) is arranged to operate the second shift ball (411) radially.

EG-45. The multi speed gear system (1) of EG-44, wherein the second shift mechanism (40) comprises a second assist ring (431) and a second shift ring (441) arranged on opposite sides of the second shift ball (412), wherein the second shift ring (441) have a second shift conical surface (442) towards the second shift ball (411), and the second shift ball (412) is configured to move the second shift ring (441) axially when the second shift ball (412) is pressed radially against the second shift conical surface (442).

EG-46. The multi speed gear system (1) of EG-45, wherein the second shift ring (441) is interfacing the second shift element (410), configured to operate the outer of the second clutch members axially when the second radial shift cam (411) moves from an inner to a middle level.

EG-47. The multi speed gear system (1) of any of EG-43 to EG-46, wherein the outer of the second clutch members is interfacing the inner of the second clutch members, and is arranged to operate the inner of the second clutch members axially from an engaged position to a disengaged position when the second radial shift cam (411) moves from a middle to and outer level.

EG-48. The multi speed gear system (1) of any of EG-43 to EG-47, wherein the multilevel second radial shift cam (411) is arranged to operate the second shift mechanism (40) through the second opening (413), wherein the second shift element (410) is interfacing the outer of the second clutch members, and is arranged to operate the outer of the second clutch members axially from an engaged position to a disengaged position when the second radial shift cam (411) moves from a lower to a higher level.

EG-49. The multi speed gear system (1) of any of EG-1 to EG-48, wherein the first shift mechanism (30) comprises a first outer clutch (323) with first and second clutch members, wherein the first outer clutch is radially arranged outside the first inner and middle clutches (321, 322).

EG-50. The multi speed gear system (1) of any of EG-11 to EG-17, wherein the second shift mechanism (40) comprises a second outer clutch (423) with first and second clutch members, wherein the second outer clutch (423) is radially arranged outside the second inner and middle clutches (421, 422).

EG-51. The multi speed gear system (1) of any of EG-1 to EG-50, wherein the two radially stacked carrier elements are inner and middle carrier elements (101, 102) and the multi speed gear system (1) further comprises an outer carrier element (103) arranged radially outside the middle carrier element (102).

EG-52. The multi speed gear system (1) of EG-51, wherein the first shift mechanism (30) is configured to releaseably rotationally engage the first shaft (71) from the outer carrier element (103).

EG-53. The multi speed gear system (1) of any of EG-51 to EG-52, wherein the first shift mechanism (30) is configured to releasably rotationally engage the second shaft (72a, 72b) with the outer carrier element (103).

EG-54. The multi speed gear system (1) of any of EG-1 to EG-54, wherein the first shift mechanism (30) comprises an axially movable first shift element, configured to shift the first and/or middle of the second clutch members axially from an engaged position to a disengaged position. The first shift element may be ring shaped and similar in function to the second shift element (410).

The following terms may be replaced by alternative terms in the application:

the first clutch member of the first inner clutch (321) may be the inner radial level of the first common clutch element (350).

the first clutch member of the first middle clutch (322) may be the middle radial level of the first common clutch element (350).

the first clutch member of the first outer clutch (323) may be the outer radial level of the first common clutch element (350).

the first clutch member of the second inner clutch (421) may be the inner radial level of the second common clutch element (450).

the first clutch member of the second middle clutch (422) may be the middle radial level of the second common clutch element (450).

the first clutch member of the second outer clutch (423) may be the outer radial level of the second common clutch element (450).

the second clutch member of the first inner clutch (321) may be the first inner clutch element (351).

the second clutch member of the first middle clutch (322) may be the first middle clutch element (352).

the second clutch member of the first outer clutch (323) may be the first outer clutch element (353).

the second clutch member of the second inner clutch (421) may be the second inner clutch element (451).

the second clutch member of the second middle clutch (422) may be the second middle clutch element (452).

the second clutch member of the second outer clutch (423) may be the second outer clutch element (453).

Gear Stack

Figure 13A:
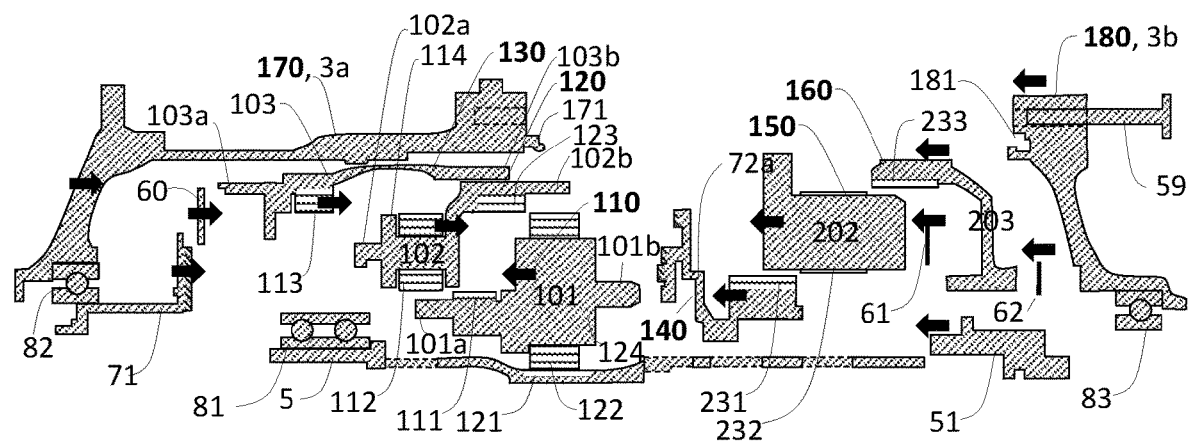
In FIG. 13a is illustrated how main elements of the multispeed gear system (1) may be assembled. The arrows indicate the direction they are entered onto the main shaft (5). Some elements related to clutches and operation of clutches have been left out from this illustration to improve readability, and to understand how the components are stacked axially in a floating manner.
Figure 13B:
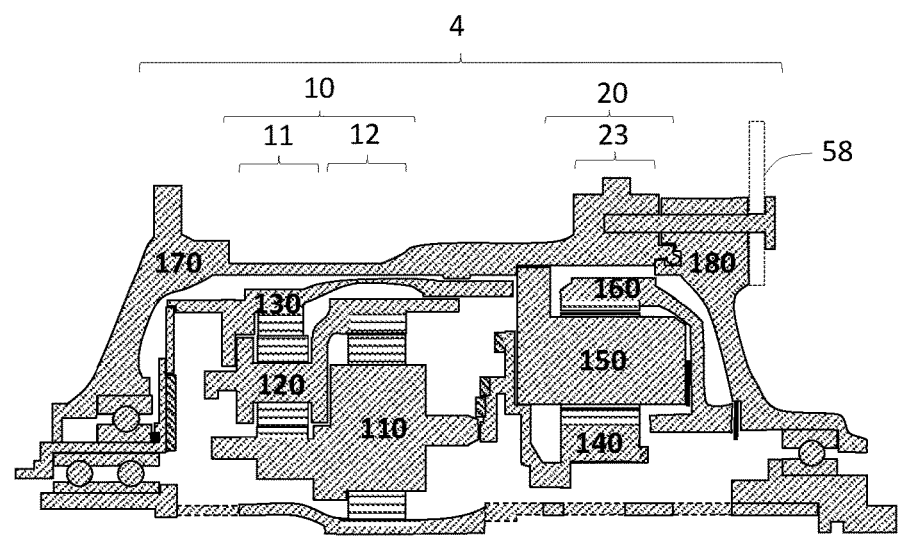
FIG. 13b illustrates the elements in FIG. 13a when they have been assembled.

Assembly and axial and radial guiding of the main components of the multispeed gear system (1) is illustrated in FIGS. 13a and 13b. A number of components have been left out in order to simplify the illustration, such as the movable parts of the clutches and the resilient members.

FIG. 13a illustrates, first of all, an embodiment of a method of assembling the components of a multispeed gear with a reduction gear according to the description above.

Initially, sub-assemblies are produced, such as e.g. the first inner carrier assembly (110), comprising the inner carrier (101), the first sun gear (111), the second planet holder (124), the second planet gears (122), the first inner carrier first engagement means (101a), and the second inner carrier engagement means (101b). Sub assembly numbering are in bold in the figure.

The first middle carrier assembly (120) comprises the middle carrier (102), the first planet holder (114), the first planetary gears (112), the second ring gear (123), the first middle carrier first engagement means (102a), and the second inner carrier engagement means (102b).

The first outer carrier assembly (130) comprises the first outer carrier (103), the first ring gear (113), the first outer carrier engagement means (103a), and the second outer carrier engagement means (103b).

The reduction inner assembly (140) comprises the second shaft (72a) and the third ring gear (231).

The reduction middle assembly (150) comprises the second middle carrier (202) and the third planetary gears (232).

The reduction outer assembly (160) comprises the second outer carrier (203) and the third ring gear (233).

The first housing sub-assembly (170) comprises the first hub part (3a) and the first outer bearing (82), and the second housing assembly (180) comprises the second hub part (3b) and the second bearing (83). The bearings may be pressed into the hub parts.

In order to reduce volume, the radius of the first sun gear (121) is smaller than the outer diameter on either side of the main shaft (5). The first inner carrier assembly (110) is therefore assembled by first inserting the first inner carrier (101) over the first sun gear (121) and then mounting the second planetary gears (122) in the second planet holder (124) integrated with the first inner carrier (101). Since the first sun gear (121) is wider than the second planetary gears (122), the first inner carrier assembly (110) has some freedom to travel axially during the assembly process.

In the next step, the first middle carrier assembly (120) is inserted axially so that the second ring gear (123) meshes with the second planetary gears (122) and the first sun gear (111) meshes with the first planetary gears (112).

Next, the first outer carrier assembly (130) is slided over the first middle carrier assembly (120) until the first ring gear (113) meshes with the first planetary gears (112).

A thrust element (60), supporting the first outer carrier assembly (130) is arranged, before adding the first shaft (71) and the first housing assembly (170). Alternatively, the thrust element may also be part of the first outer carrier assembly (130). This allows the first outer clutch element (353) and the first outer resilient element (383) to be arrested between the thrust element and the first outer carrier (103). The thrust element (60) is arranged to rotationally support the first outer carrier assembly (130) both axially and radially, and be supported axially and radially by the first shaft (71), radially and axially fixed between the first housing assembly (170) and the main shaft (5) by intermediate first inner and outer bearings (81, 82).

On the opposite end of the multispeed gear (1), the reduction inner assembly (140) is added, supporting the first inner carrier assembly (110) axially. The reduction middle assembly (150) is arranged around the reduction inner assembly (140) until the third sun gear (231) properly meshes with the third planetary gears (232).

The reduction outer assembly (160) is arranged to allow the third ring gear (233) to mesh with the third planetary gears (232) with a second shim (62) there between.

A main shaft end element (51) is mounted on the end of the main shaft (5) acting as a support for the second bearing (83) thereafter mounted as part of the second housing assembly (180), which is forced against the first housing assembly (170). A snap lock comprising first and second snap lock members (171, 181) arranged on the first and second housing assembly, respectively, ensure that the multispeed gear mechanism (1) may be shipped or transferred to the next assembly stage in one piece. The first and second housing assemblies are later secured with fixing screws (59) that may secure a brake disc (58), shown dashed in FIG. 13b, to the housing (3). The first housing assembly may be prepared with threaded holes, see dashed area, for the fixing screws (59).

From the description above, it will be understood that the assembly of the components results in a final multispeed gear system (1) with axial and radial guiding of the components relative each other.

Figure 13C:
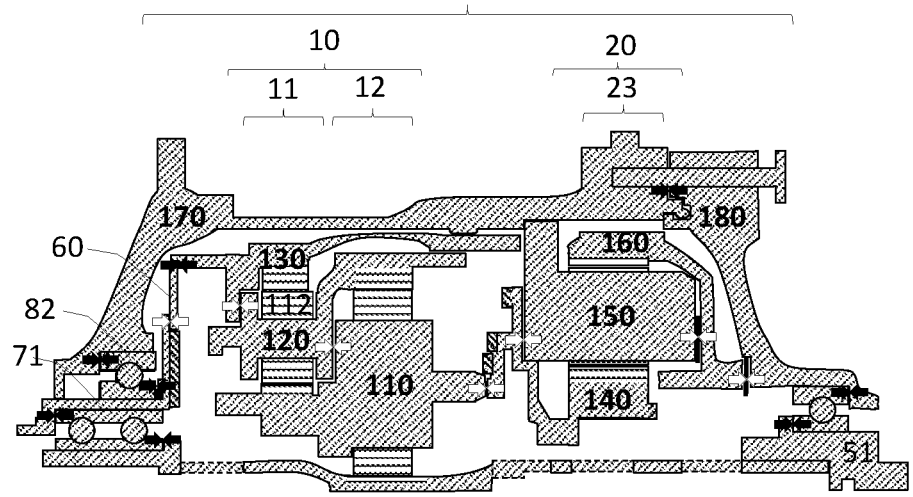
FIG. 13c illustrates the elements of FIG. 13b with an indication of axial alignment.

Axial guiding for the internal components of the multispeed gear system (1) is illustrated in FIG. 13c. Fixed axial support is indicated by double filled arrows, and gliding support i.e. relative rotational, by double open arrows. As can be seen from the drawings, the components of the gear stack are floating and axially interfacing neighboring components.

Internally in the first gear section (10), the first inner carrier assembly (110) is axially facing, and glidingly supporting, the first middle carrier (120), which on its opposite side of the first planetary gears (112) is axially facing and glidingly supporting the first outer carrier (130).

The first outer bearing (82), to the left in FIG. 13c, is axially facing non-rotationally supporting the first shaft (71). In addition, this interface is pre-tensioned when the gear is mounted by a flexible element, such as an O-ring.

The outer edge of thrust element (60) is axially fixed relative the first outer assembly (130) and the inner edge is axially fixed, but free to rotate relative the first shaft (71).

In the second gear section (20) the reduction inner assembly (140) is axially facing, and glidingly supporting the reduction middle assembly (150) in the direction of the first gear section (10).

On the opposite side of the second gear section (20), the reduction middle assembly (150) is axially facing, and glidingly supporting the reduction outer assembly (160) with the first shim (61) in between.

The reduction outer assembly (160) is axially facing, and glidingly supporting the second housing assembly (180). In this interface the second shim (62) is arranged.

The first and second gear sections (10, 20) are axially facing and supporting each other in a rotational interface between the first inner carrier assembly (110) and the reduction inner assembly (140).

Further there is non-rotational axial support between bearings and interfacing components and between the first and second housing assemblies (170, 180).

The second shim (62) is during assembly calibrated to give specified axial play for the gear stack allowing the gear stack components to freely rotate around the main shaft (5) within the hub shell (3), reducing the play to give each of gear stack components a decided axial position.

Due to the axially movable clutch elements, i.e. the first inner, middle, and outer clutch element (351, 352, 353) of the first shift mechanism (30), the second inner, middle, and outer clutch element (451, 452, 453) of the second shift mechanism (40), and the third second clutch element (551) of the third shift mechanism (50), the exact axial position of each of the clutch elements will vary as described for all the components in the epicyclical gear stack (502).

To achieve independent operation of the selectable clutch elements that is not sensitive to an exact axial position of the clutch elements, the shift axle has radially operating first, second, and third radial shift cams (311, 411, 511). As explained above, the first, second, and third shift balls (312, 412, 512) are by being pushed radially out from hub center through first, second, and third openings (313, 413, 513) in the main shaft (5) by the respective first, second, and third radial shift cams (311, 411, 511). The first, second, and third shift balls (312, 412, 512) wedges apart pairs of the axially floating, rotatably locked, shift rings, i.e., the first assist and shift rings (331, 341), the second assist and shift rings (431, 441) and the third assist and shift rings (531, 541).

The relative distance between a pair of shift rings is only dependent of the radial position of the shift balls, and independent of their axial position.

The first, second, and third shift balls (312, 412, 512) are being axially positioned by the non-rotating respective shift rings, again determined by the axial position in the epicyclical gear stack of the axially fixed components in FIG. 13c, carrying the axially fixed clutch components, i.e. the first common clutch element (350), the second common clutch element (450) and the third second clutch element (551).

As a result of this constellation, each of the first, second, and third shift mechanisms (30, 40, 50), as well as the first, second, and third radial shift cams (311, 411, 511) can float axially without influencing on the separation of the pairs of shift ring pairs, and consequently without affecting the operation of the shifting. As a result of this constellation each of the first, second, and third shift mechanisms (30, 40, 50).

Figure 13D:
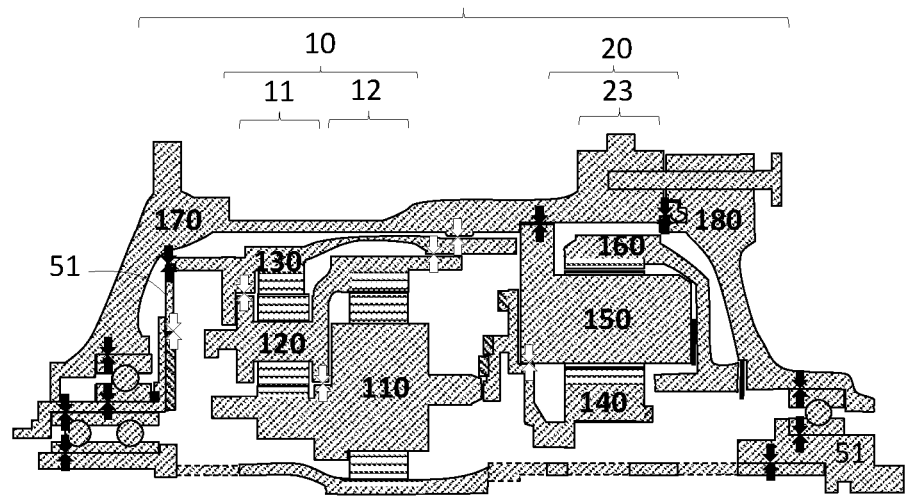
FIG. 13d illustrates the same as in FIG. 13b with an indication of radial alignment.

Radial guiding of the internal components of the multispeed gear system (1) is illustrated in FIG. 13d. Apart from the meshing of the gears of the first, second, and third epicyclical gear sets (11, 12, 23) radial guiding is achieved by fixed and gliding support between components. In FIG. 13d fixed radial support is indicated by double filled arrows, and gliding support, i.e. relative rotational, by double open arrows.

Gliding support, i.e. relative rotational movement is achieved in the first gear section (10) by cylindrical face mating of the first inner carrier assembly (110) and the first middle carrier assembly (120), in this case between the first and second epicyclical gear sets (11, 12). Further the first middle carrier assembly (120) and the first outer carrier assembly are cylindrically face mating on opposite sides of the first gear section (10). Cylindrical face mating also takes place between the first outer carrier assembly (130) and the first housing assembly (170), and internally in the rotational bearings.

In the second gear section (20), gliding support takes place between the reduction inner assembly (140) and the reduction middle assembly (150).

Further, fixed radial support, i.e. non-rotational, takes place in interfaces between bearings and other components and in the snap lock. The reduction middle assembly is radially fixed relative the first housing assembly (170), providing radial support for the second gear section (20).

The outer edge of thrust element (60) is radially fixed relative the first outer assembly (130) and the inner edge is glidingly supported by the first shaft (71).

In the next sections, embodiments related to the stacking will be disclosed.

EG-60. The multi speed gear system (1) of any of EG-1 to EG-54, wherein the first gear section (10) is arranged axially floating about the main shaft (5).

EG-61. The multi speed gear system (1) of EG-60, wherein the first gear section (10) is axially delimited by a hub shell (3).

EG-62. The multi speed gear system (1) of EG-61, wherein the hub shell (3) comprises first and second housing assemblies (170, 180), configured to be entered onto the main shaft (5) from opposite ends of the main shaft (5), and further configured to delimit axial play of the first gear section (10) from respective sides.

EG-63. The multi speed gear system (1) of EG-62, wherein the multi speed gear system (1), comprises a second shim (62) with a thickness selected before assembling together the first and second housing assemblies (170, 180), based on the difference between measured and maximum axial play of the components of the gear mechanism (4).

EG-64. The multi speed gear system (1) of EG-63, wherein the first shaft (71) is arranged axially between the housing assembly (170) and the first gear section (10) being axially supported by the housing assembly (170) on one side and axially supporting the first gear section (10) on the opposite side.

EG-65. The multi speed gear system (1) of any of EG-62 to EG-64, wherein the gear mechanism (4) comprises a second gear section (20) arranged axially on the opposite side of the first gear section (10) with regard to the first shaft (71), the second gear section (20) being axially supported by the second housing assembly (180) on one side, and axially supporting the first gear section (10) on the other side.

EG-66. The multi speed gear system (1) of any of EG-62 to EG-65, wherein the first and second housing assemblies (170, 180) comprise respective snap lock members (171, 181), configured to enter into lock when the first and second housing assemblies (170, 180) are pressed together.

Stacking

In an independent stacking embodiment EM-1, the invention is a method for assembling a pedally propelled vehicle multi speed gear system (1) of EG-1 to EG-66

The method comprises;

arranging the first gear section (10) axially floating about the main shaft (5).

EM-2: The method of EM-1, comprising;

arranging a hub shell (3) about the gear mechanism (4), and fixing the first gear section (10) axially relative the main shaft (5) by the hub shell (3).

EM-3: The method of EM-2, wherein the hub shell (3) comprises first and second housing assemblies (170, 180), the method comprises;

entering the first and second housing assemblies (170, 180) onto the main shaft (5) from opposite ends of the main shaft (5), and wherein the first and second housing assemblies (170, 180) delimit axial play of the first gear section (10) from respective sides.

EM-4: The method of EM-3, wherein the method comprises;

selecting a second shim (62) based on the difference between measured and maximum axial play of the components of the gear mechanism (4) before assembling together the first and second housing assemblies (170, 180).

EM-5: The method of EM-3 or EM-4, wherein the method comprises;

arranging the first shaft (71) axially between the housing assembly (170) and the first gear section (10), wherein the first shaft (71) being axially supported by the housing assembly (170) on one side and axially supporting by the first gear section (10) on the opposite side.

EM-6: The method of EM-5, wherein the method comprises;

arranging a second gear section (20) axially on the opposite side of the first gear section (10) with regard to the first shaft (71), wherein the second gear section (20) is axially supported by the second housing assembly (180) on one side, and axially supporting the first gear section (10) on the other side.

In the exemplary embodiments, various features and details are shown in combination. The fact that several features are described with respect to a particular example should not be construed as implying that those features by necessity have to be included together in all embodiments of the invention. Conversely, features that are described with reference to different embodiments should not be construed as mutually exclusive. As those with skill in the art will readily understand, embodiments that incorporate any subset of features described herein and that are not expressly interdependent have been contemplated by the inventor and are part of the intended disclosure. However, explicit description of all such embodiments would not contribute to the understanding of the principles of the invention, and consequently some permutations of features have been omitted for the sake of simplicity or brevity.

The invention claimed is:

1. A pedally propelled vehicle multi speed gear system comprising a gear mechanism, the gear mechanism comprising:
    a main shaft;
    a hollow first shaft and a hollow second shaft, both of the first and second shafts being axially stationary and rotatably arranged about the main shaft;
    an epicyclical first gear section arranged about the main shaft between the first and second shafts, and comprising two radially stacked carrier elements; and
    a first shift mechanism arranged between the first shaft and the epicyclical first gear section, and configured to rotationally engage the first shaft with either of the two radially stacked carriers,
    wherein the first shift mechanism comprises two first clutches radially stacked about the main shaft,
    wherein the two first clutches have interfacing first and second clutch members, respectively,
    wherein the first clutch member of the two first clutches is fixed to the first shaft and arranged to remain axially stationary relative the main shaft, and the second clutch member of the two first clutches is rotatably connected to the two radially stacked carriers, respectively, and
    wherein the first clutch member of the two first clutches is an integrated first common clutch element integrated with the first shaft.

2. The pedally propelled vehicle multi speed gear system of claim 1, further comprising a second shift mechanism arranged between the epicyclical first gear section and the second shaft configured to rotationally engage the second shaft with either of the two radially stacked carriers,
    wherein the second shift mechanism comprises two second clutches radially stacked about the main shaft,
    wherein the two second clutches have first and second interfacing clutch members, respectively,
    wherein the first interfacing clutch members of the two second clutches are fixed to the second shaft and arranged to remain axially stationary relative the main shaft, and the second interfacing clutch members of the two second clutches, are rotatably connected to the two radially stacked carriers, respectively, and wherein the first clutch members of the two second clutches are an integrated second common clutch element integrated with the second shaft.

3. The pedally propelled vehicle multi speed gear system of claim 2, wherein the second shift mechanism comprises an axially movable second shift element, configured to shift an outer of the second clutch members axially from an engaged position to a disengaged position without axially moving an inner clutch member.

4. The pedally propelled vehicle multi speed gear system of claim 3, wherein the second common clutch element comprises a radially extending shift opening through the first clutch members, arranged to host the second shift element, wherein the second shift element is arranged in the shift opening between the second common clutch element and the first clutch members.

5. The pedally propelled vehicle multi speed gear system of claim 1, wherein the multi speed gear system comprises a shift axle arranged inside the main shaft, and configured to operate the first and/or second shift mechanism when the shift axle is rotated relative the main shaft, wherein the shift axle comprises a radial first shift cam with multiple radial levels, wherein each level has a specific radius, wherein the main shaft comprises a first opening and the multilevel first radial shift cam is arranged to operate the first shift mechanism through the first opening, wherein the first shift mechanism comprises a first shift ball arranged in the first opening, wherein the multilevel first radial shift cam is arranged to operate the first shift ball radially, wherein the first shift mechanism comprises an axially stationary first assist ring and an axially movable first shift ring arranged on opposite sides of the first shift ball, and wherein the first shift ring has a first shift conical surface towards the first shift ball, and the first shift ball is configured to move the first shift ring axially when the first shift ball is pressed radially against the conical surface.

6. The pedally propelled vehicle multi speed gear system of claim 1, comprising a shift axle comprising a first shift cam with multiple radial levels, wherein each level has a specific radius, wherein the main shaft comprises a first opening and the multilevel first radial shift cam is arranged to operate the first shift mechanism through the first opening, and wherein the inner of the second clutch members is interfacing the outer of the second clutch members, and is arranged to operate the outer of the second clutch members axially from an engaged position to a disengaged position when the first radial shift cam moves from a lower to a higher level.

7. The pedally propelled vehicle multi speed gear system of claim 6, wherein the second shift mechanism comprises a second shift element, and the shift axle comprises a second shift cam with multiple radial levels where each level has a specific radius, wherein the main shaft comprises a second opening and the multilevel second radial shift cam is arranged to operate the second shift mechanism through the second opening, and wherein the second shift element is interfacing the outer of the second clutch members, and is arranged to operate the outer of the second clutch members axially from an engaged position to a disengaged position when the second radial shift cam moves from a lower to a higher level.

8. A pedally propelled vehicle multi speed gear system comprising a gear mechanism, the gear mechanism comprising:

a main shaft;

a hollow first shaft and a hollow second shaft, both of the first and second shafts being axially stationary and rotatably arranged about the main shaft;

an epicyclical first gear section arranged about the main shaft between the first and second shafts, and comprising two radially stacked carrier elements; and a first shift mechanism arranged between the first shaft and the epicyclical first gear section, and configured to rotationally engage the first shaft with either of the two radially stacked carriers, wherein the first shift mechanism comprises two first clutches radially stacked about the main shaft, and wherein the epicyclical first gear section is arranged axially floating about the main shaft and one of the radially stacked carrier elements is axially and radially delimited by the hollow first shaft.

9. The pedally propelled vehicle multi speed gear system of claim 8, wherein the epicyclical first gear section is axially delimited by a hub shell and the hub shell comprises first housing assembly and second housing assembly, configured to be entered onto the main shaft from opposite ends of the main shaft, and further configured to delimit axial play of the epicyclical first gear section from respective sides.

10. The pedally propelled vehicle multi speed gear system of claim 9, wherein the first shaft is arranged axially between the first housing assembly and the epicyclical first gear section being axially supported by the first housing assembly on one side and axially supporting the epicyclical first gear section on the opposite side.

11. The pedally propelled vehicle multi speed gear system of claim 10, wherein the gear mechanism comprises a second gear section arranged axially on the opposite side of the epicyclical first gear section with regard to the first shaft, the second gear section being axially supported by the second housing assembly on one side, and axially supporting the epicyclical first gear section on the other side.

12. A method for assembling a pedally propelled vehicle multi speed gear system, comprising a gear mechanism, the gear mechanism comprising:

a main shaft;

a hollow first shaft and a hollow second shaft, both of the first and second shafts being axially stationary and rotatably arranged about the main shaft;

an epicyclical first gear section arranged about the main shaft between the first and second shafts, and comprising two radially stacked carrier elements; and a first shift mechanism arranged between the first shaft the epicyclical first gear section, and configured to rotationally engage the first shaft with either of the two radially stacked carriers, wherein the first shift mechanism comprises two first clutches radially stacked about the main shaft, wherein the epicyclical first gear section is arranged axially floating about the main shaft, and one of the radially stacked carrier elements is axially and radially delimited by the hollow first shaft, wherein the method comprises arranging the epicyclical first gear section axially floating about the main shaft, wherein the multi-speed gear system comprises a hub shell comprising first and second housing assemblies, the method further comprising:

arranging the hub shell about the gear mechanism, and fixing the epicyclical first gear section axially relative the main shaft by the hub shell, and entering the first and second housing assemblies onto the main shaft from opposite ends of the main shaft, wherein the first and second housing assemblies delimit axial play of the epicyclical first gear section from respective sides.

13. The method of claim 12, further comprising selecting a shim based on the difference between measured and maximum axial play of the components of the gear mechanism before assembling together the first and second housing assemblies.

14. The method of claim 13, further comprising arranging the first shaft axially between the housing assembly and the epicyclical first gear section, wherein the first shaft is axially supported by the housing assembly on one side and axially supporting by the epicyclical first gear section on the opposite side.

15. The method of claim 14, further comprising arranging a second gear section axially on the opposite side of the epicyclical first gear section with regard to the first shaft, wherein the second gear section is axially supported by the second housing assembly on one side, and axially supporting the epicyclical first gear section on the other side.

* * * * *